United States Patent
Reis et al.

(10) Patent No.: US 11,710,418 B2
(45) Date of Patent: Jul. 25, 2023

(54) EDUCATION-BASED NOMADIC SEQUENCING RECOMMENDATIONS FOR FAMILIES

(71) Applicant: Airbnb, Inc., San Francisco, CA (US)

(72) Inventors: Joao Pedro Carvalho Oliveira de Miranda Reis, San Francisco, CA (US); Cynthia Yue Chen, San Francisco, CA (US); Sara Louise Sodine, San Francisco, CA (US); Dan Young Li, San Francisco, CA (US)

(73) Assignee: Airbnb, Inc., San Francisco, CA (US)

( * ) Notice: Subject to any disclaimer, the term of this patent is extended or adjusted under 35 U.S.C. 154(b) by 301 days.

(21) Appl. No.: 16/797,692

(22) Filed: Feb. 21, 2020

(65) Prior Publication Data

US 2021/0264801 A1 Aug. 26, 2021

(51) Int. Cl.
*G06Q 10/02* (2012.01)
*G09B 5/02* (2006.01)
*G06Q 10/1093* (2023.01)

(52) U.S. Cl.
CPC ............. *G09B 5/02* (2013.01); *G06Q 10/02* (2013.01); *G06Q 10/1093* (2013.01)

(58) Field of Classification Search
None
See application file for complete search history.

(56) References Cited

U.S. PATENT DOCUMENTS

| | | | |
|---|---|---|---|
| 2004/0096811 A1 | 5/2004 | Anneswamy et al. | |
| 2007/0185744 A1* | 8/2007 | Robertson | G06Q 50/14 705/5 |
| 2009/0313055 A1* | 12/2009 | Martin | G06Q 10/02 705/5 |
| 2012/0221595 A1 | 8/2012 | Slowe et al. | |
| 2014/0006215 A1 | 1/2014 | Hornthal et al. | |
| 2015/0163256 A1* | 6/2015 | Frank | H04W 4/21 715/753 |
| 2016/0012538 A1 | 1/2016 | Costaceque-cecchi-dimeglio et al. | |
| 2019/0057357 A1* | 2/2019 | Guan | G06Q 10/06314 |

(Continued)

OTHER PUBLICATIONS

Information on Curriculum Travel of America, 2018, www.CtaFieldTrips.com, archived web pages printed through www.archive.org (Year: 2013).*

(Continued)

*Primary Examiner* — Naresh Vig

(74) *Attorney, Agent, or Firm* — Schwegman Lundberg & Woessner, P.A.

(57) ABSTRACT

A system and a method are disclosed for augmenting a required curriculum of an individual in a nomadic group. The system retrieves, from a client device, a request for an accommodation recommendation from the nomadic group, which includes an individual with a required curriculum. The system maps the curriculum to destinations in a destination database and determines a set of geographic regions including the destinations. The system optimizes an accommodation recommendation based on available listings in the geographic regions and geographic locations of the destinations and transmits, for display on a user interface at the client device, a user interface comprising the accommodation recommendation.

20 Claims, 15 Drawing Sheets

(56) References Cited

U.S. PATENT DOCUMENTS

2021/0136537 A1    5/2021   Zaltzman et al.
2021/0264325 A1    8/2021   Reis et al.

OTHER PUBLICATIONS

Kurashima et al., Joint Modeling of User's Activity Area and Interests for Location Recommendation, 2013, WSDM'13 (Year: 2013).*

Information on 360SchoolsTrips, 2019, 360schooltrips.com, archived web pages printed through www.archive.org (Year: 2019).*

Information on eduSTAR Student Tours, 2018, eduSTAR, archived web pages printed through www.archive.org (Year: 2018).*

Curriculum Definition, Dec. 8, 2015, www.edglossary.org (Year: 2015).*

"U.S. Appl. No. 16/797,706, Non Final Office Action dated Dec. 15, 2022", 19 pgs.

"U.S. Appl. No. 16/797,706, Preliminary Amendment filed Apr. 6, 20", 3 pgs.

CTA, "Welcome to CTA: Information on Curriculum Travel of America", CTAfieldtrips.com, [Online], Retrieved from the Internet: <URL:https://web.archive.org/web/20180825091800/https://www.ctafieldtrips.com/>, (Aug. 25, 2018), 12 pages.

Kurashima, T, et al., "Geo Topic Model: Joint Modeling of User's Activity Area and Interests for Location Recommendation", Proceedings of the Sixth ACM International Conference on Web Search and Data Mining 375-384, (Feb. 2013), 10 pgs.

"U.S. Appl. No. 16 797,706, Response filed Apr. 12, 2023 to Non Final Office Action dated Dec. 15, 2022", 11 pgs.

\* cited by examiner

| Curriculum scope 310 | Age 315 | Curriculum 320 | | Sequence 345 |
|---|---|---|---|---|
| | | Subjects 325 | Topics 330 | |
| Kindergarten | 5-6 years | Reading | Go, Dog. Go! | August |
| | | | ... | ... |
| | | Science | Rainbow Fish | May |
| | | | Animals | August |
| | | | Plants | September |
| ... | ... | ... | ... | ... |
| 10th grade | 15-16 years | World History | Revolutions | First Quarter |
| | | | Industrialization | Second Quarter |
| ... | ... | ... | ... | ... |
| Sommelier Certification | 21+ years | Service | N/A | First |
| | | Theory | N/A | Second |

*FIG. 3B*

Dorchester, UK

Countryside Apartment

Check in
Dec 31, 2021
11:30 AM

Private apartment •
Full Kitchen • Wifi

☆ 4.3 (56)

Suggested: Explore town centre   Ⓥ

Jan 1, 2022

---

10:00 AM – Hardy Bus Tours   Ⓐ

Visit Hardy' Burial Place in Stinsford and walk among the moorland like Tess during this guided tour of Dorset County Review:
*Tess of the D'Urbervilles, The Mayor of Casterbridge, Far from the Madding Crowd*

Jan 2, 2020

---

9:30 AM - Check out ⟶ Countryside Apartment

| Train at 10:01 AM | Dorchester – Paddington Station |
| Train at 1:47 PM | Paddington Station - Heathrow |
| Flight 431 at 6:27 PM | LHR-BOS |

Trip Summary

---

Guests: 2 adults

Learning Objectives

Explore the places that inspired the fictional works of Charles Dickens and Thomas Hardy in the historical context of the Victorian Era

[ Book Itinerary ]
[ Edit Itinerary ]

Total: $750

FIG. 7B

EDUCATION-BASED NOMADIC SEQUENCING RECOMMENDATIONS FOR FAMILIES

CROSS REFERENCE TO RELATED APPLICATIONS

This application is related to U.S. application Ser. No. 16/797,706, entitled "EDUCATION-BASED NOMADIC SEQUENCING RECOMMENDATIONS FOR SATISFYING A CURRICULUM SCOPE," and filed on Feb. 21, 2020, which is incorporated by reference herein in its entirety.

TECHNICAL FIELD

The disclosure generally relates to the field of database systems, and, more particularly, to structuring data entries to determine destinations corresponding to a required curriculum and displaying user interfaces for same.

BACKGROUND

Nomadic groups that travel along nomadic paths may seek self-sufficiency for certain aspects of life on the road, such as providing a required curriculum for an individual within the nomadic group. Such individuals face unique challenges with following a require curriculum while on the move as they may not have access to a traditional classroom setting.

Travel patterns of nomadic groups may be quite varied in a multitude of ways, for example, periods of time, range of locations, range of interests and the like. Hence, conventional curriculums do not suit specific individuals. For example, though the nomadic group may travel with the required curriculum in mind, members of the nomadic group may be unsure of what locations in the world might best augment the required curriculum of the individual to take advantage of their mobile lifestyle to further enhance the learning experience of the specific individual as they follow the required curriculum.

Further, existing accommodation management systems focus on identifying accommodations and experiences for a general group of travelers, rather than those with a specified objective in mind most suitable for themselves. Accordingly, existing accommodation management systems leave nomadic groups without an adequate way to streamline enhancing a require curriculum for an individual.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIGS. 3A-3C illustrates examples of mappings between curriculums and destinations, according to one embodiment.

FIGS. 7A-7B illustrate example user interfaces showing an itinerary of an accommodation recommendation, according to one embodiment.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

One embodiment of a disclosed system, method and computer readable storage medium that includes enabling an accommodation management system to determine an accommodation recommendation based on a required curriculum. When a nomadic group requests an accommodation recommendation, an accommodation management system determines enhanced education destinations that would augment the required curriculum of an individual in the nomadic group. The accommodation management system optimizes an accommodation recommendation based on available listings in geographic regions of the enhanced education destinations that may be displayed on a screen of a computing device. Thus, the accommodation management system may provide for display on a screen of the computing device an accommodation recommendation for the nomadic group to enhance the educational experience of the individual with the required curriculum.

In one embodiment, an accommodation management system receives, from a client device, a request for an accommodation recommendation from a nomadic group following a nomadic path including an individual with a required curriculum. The accommodation management maps the required curriculum to enhanced education destinations in a destination database and determines a set of geographic regions including the enhanced education destinations. The accommodation management system optimizes the accommodation recommendation based on available listings in the geographic regions and locations of the enhanced education destinations. The accommodation management system provides a user interface comprising the accommodation recommendation for display to the client device.

Accommodation Management System Environment

Figure 1:
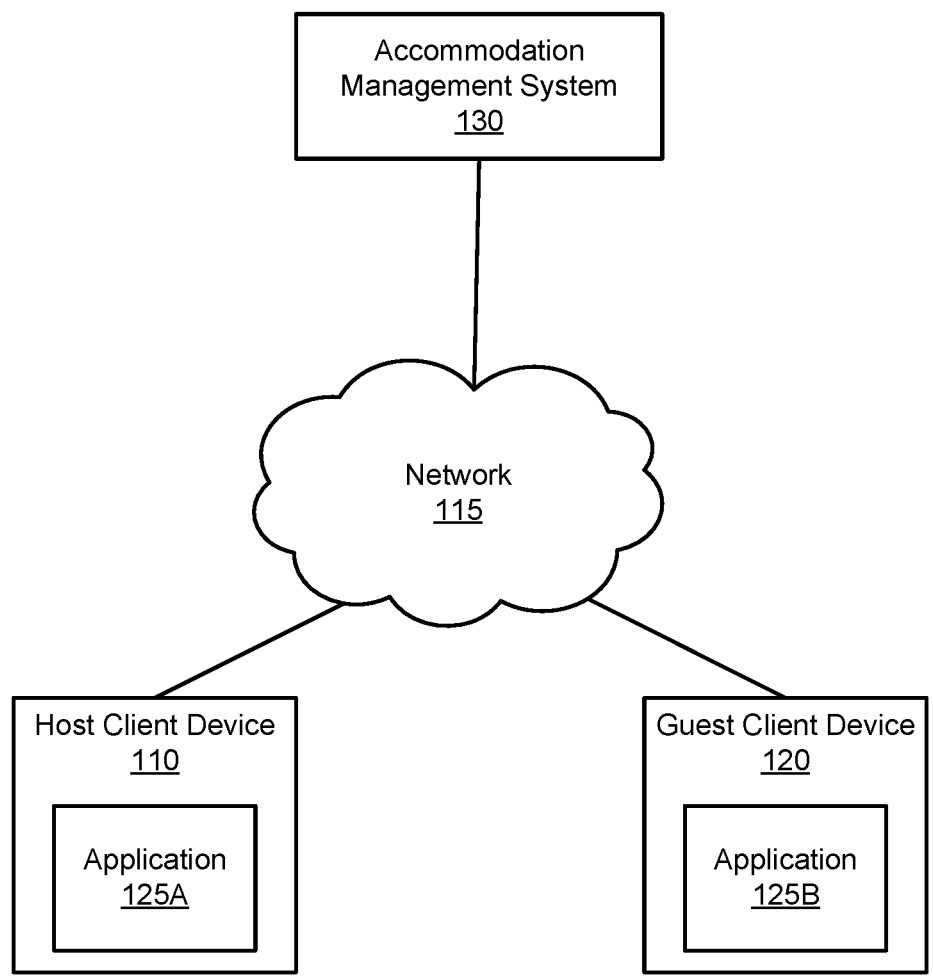
FIG. 1 illustrates one embodiment of an environment for an accommodation management system.

Figure (FIG. 1 illustrates one embodiment of an example network environment 100 for components of an accommodation management system 130. The environment 100 includes a host client device 110, network 115, a guest client device 120, and an accommodation management system 130. Though only one of each type (e.g., host or guest) of client device is shown in FIG. 1, other embodiments may use more than one client device of either type. These various components are now described in additional detail.

Host client device 110 is a client device of a host user of accommodation management system 130. The term host user, as used herein, refers to a user having an electronic account used with the accommodation management system 130 that lists accommodations on accommodation management system 130. The term guest user, as used herein, refers to a user having an account used user of accommodation management system 130 that books a listed accommodation. The host user and the guest user interface with the accommodation management system 130 and each other through their respective electronic accounts. The term client device 110, whether used with reference to a host user or a guest user, refers to a computing device such as a smartphone, laptop, computer, a smartwatch or any other computing device that may be configured to access the accommodation management system 130.

Host client device 110 includes application 125A, and guest client device 120 includes application 125B. The term application, when used in connection with accommodation management system 130, whether used in reference to a host user, a guest user, or a third-party user, refers to an application capable of carrying out actions relating to use of accommodation management system 130 that are described herein. Examples of such actions include outputting listings for display, completing a booking of a listed accommodation, outputting notifications to a host or a guest, completing a check-in or check-out process, commanding an entry mechanism (e.g., electronic lock) to an accommodation to unlock or lock, and the like. In some embodiments, each of the client devices includes one or more instances of an application 125 associated with the accommodation management system 130. Any number of client devices may be included in environment 100; the depiction of only one of each of host client device 110 and guest client device 120 is merely for convenience.

Network 115 may be any suitable communications network for data transmission. In an embodiment such as that illustrated in FIG. 1, network 115 uses standard communications technologies and/or protocols and can include the Internet. In another embodiment, the entities use custom and/or dedicated data communications technologies. Network 115 connects host client device 110, guest client device 120 (or client devices, in other embodiments), and any other client device to accommodation management system 130 such that the host client device 110, guest client device, and accommodation management system 130 can transmit data back and forth.

Accommodation management system 130 facilitates activity relating to listing, booking, and physically accessing an accommodation. Further details relating to such activities are described throughout with reference to FIGS. 2-12 below.

Accommodation Management System Configuration

Figure 2:
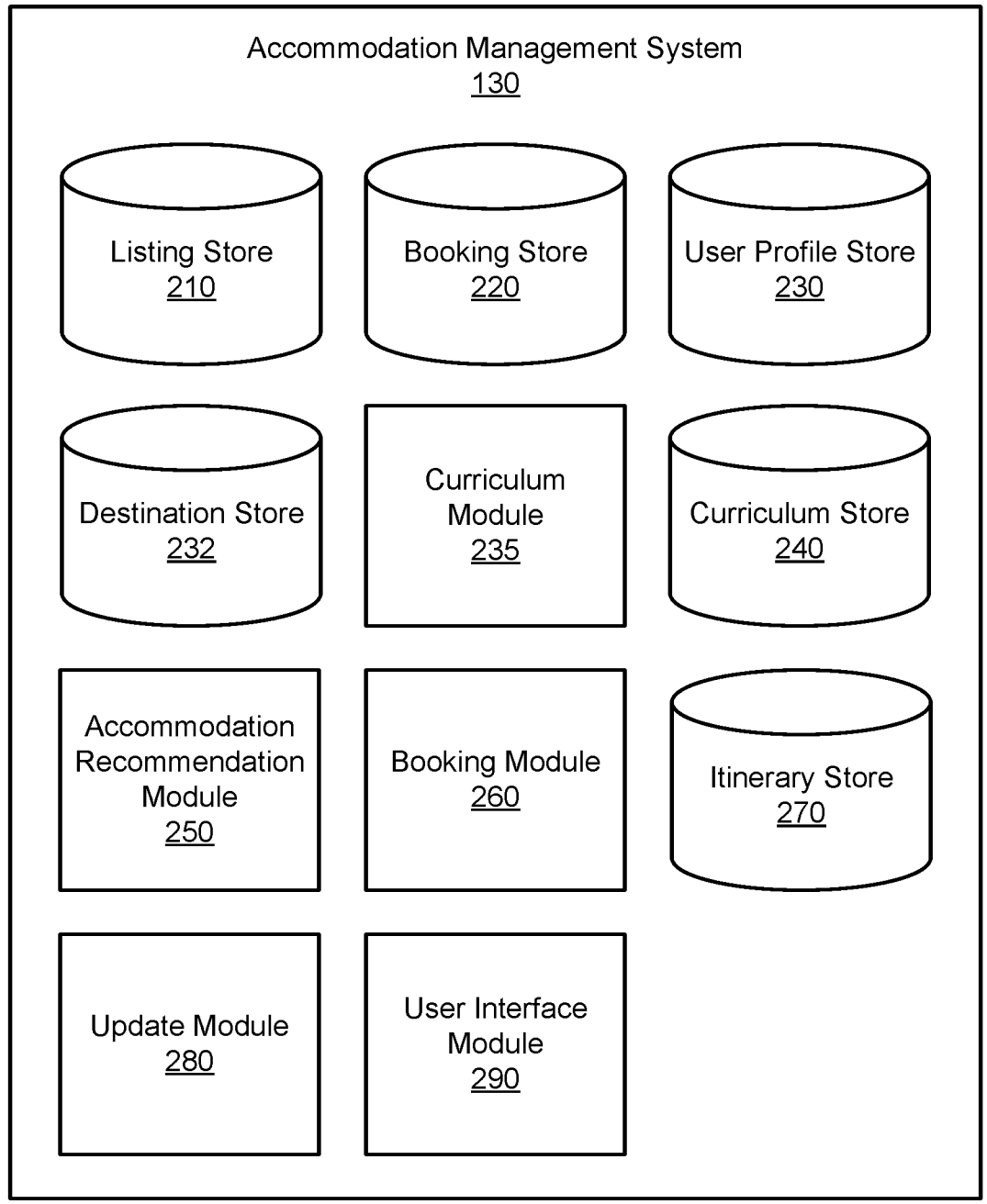
FIG. 2 illustrates one embodiment of an accommodation management system.

FIG. 2 illustrates one embodiment of an example accommodation management system 130. Accommodation management system 130 controls listing the listing and booking of accommodations listed by host users through the accommodation management system 130. The term accommodation, as used herein, may refer to a space for lodging that may be booked by a guest user. Accommodation management system 130 includes listing store 210, booking store 220, user profile store 230, destination store 232, curriculum module 235, curriculum store 240, accommodation recommendation module 250, booking module 260, itinerary store 240, update module 280, and user interface module 290. The data stores and modules depicted with reference to FIG. 2 are merely exemplary; fewer or more databases and modules may be used to achieve the subject matter described herein.

Accommodation management system 130 stores information describing listings in listing store 210. The accommodation management system 130 receives information from a host user relating to an accommodation for rent and stores the information as a listing in listing store 220. The term listing, as used herein, refers to a description of an accommodation for rent that may be advertised to guest users of accommodation management system 130. Information about each listing may include information describing the accommodation, for example, a geographic location and/or region of the accommodation, short description of the accommodation, list of house rules, list of amenities, pictures of the accommodation, spatial layout or description, price of the accommodation over a time period (e.g., per night, per stay, etc.), attributes describing the accommodation, and guest user reviews of the accommodation. In some embodiments, listing store 210 is a data structure that stores connections between listings, host users, and other information about listings.

Accommodation management system 130 also stores information describing the availability of each listing in listing store 210. Accommodation management system 130 receives availability parameters from a host user of a listing and stores these availability parameters in listing store 210. As accommodation management system 130 receives information indicating that a listing has been booked by a guest user for certain dates, accommodation management system 130 updates the availability of the listing to indicate that the listing is unavailable on those dates. In some embodiments, the information describing the availability of each listing may include an indication of whether an unavailable listing is reserved or booked for a time period. In some embodiments, accommodation management system 130 stores availability by day for each listing in listing store 210. For example, if a guest user has booked an accommodation of a listing from Monday to Wednesday, information describing the listing in listing store 130 may indicate that the listing is unavailable on Monday and Tuesday, but is available again starting Wednesday.

Accommodation management system 130 stores information describing bookings in booking store 220. The term booking, as used herein, refers to a reservation for the accommodation of a listing by a guest user for a specific upcoming time period. The information describing bookings includes the listing, the guest user who booked the accommodation, and a time period the accommodation is booked for. In some embodiments, a booking may further include information from the listing or other information about the booking, such as other guest users associated with the same booking or check-in information from the host user. In some embodiments, accommodation management system 130 stores bookings in listing store 210 in association with listings. In these embodiments, each listing may be associated with multiple bookings by different guest users. In further embodiments, booking store 220 is a data structure that stores connections between listings, guest users, time periods, and other information about bookings.

Accommodation management system 130 stores information describing user profiles in user profile store 230, e.g. a guest user account for each guest user and a host user account for each host user. A user profile describes a user and may include the user's name and contact information and/or user preference information indicating the user's interests and experiences. Accommodation management system 130 stores an indication of whether each user of the accommodation management system 130 is a host user, a guest user, or both in user profile store 230. For host users, accommodation management system 130 stores information describing listings associated with the host user in user profile store 230, which include accommodations that the host user lists for rent on accommodation management system 130. For guest users, accommodation management system 130 stores historical booking information, which describes listings and other travel arrangements previously booked by the guest user, for each guest user in user profile store 230. In embodiments where a user is both a host user and a guest user, accommodation management system 130 may store information describing both listings and bookings associated with the user in booking store 230.

In some embodiments, historical booking information also describes accommodations the guest user stayed at but were booked by another guest user. For example, Josh, a guest user, may book through his guest user account an accommodation in Park City for the third week of December via the accommodation management system 130 and invite, via the accommodation management system 130, Winston, another guest user having a guest user account, to join a trip to stay at a lodge in Park City associated with the accommodation. By accepting the invitation, Winston may be able to receive through his guest user account information associated with the booking from accommodation management system 130. The accommodation management system 130 stores the accommodation (i.e., the lodge in Park City) and time period (i.e. the third week of December) as historical booking information for both Josh and Winston in user profile store 230 with their respective guest user accounts.

Accommodation management system 130 also stores user preference information for each guest user with the guest user account in user profile store 230. User preference information includes attributes that a guest user prefers in a listing or for other aspects of a travel experience. The term attribute, as used herein, refers to a characteristic of an entity, such as a listing in listing store 210. For example, user preference information may indicate that a guest user prefers their accommodations to be near public transit and include a hot tub. In some embodiments, the guest user ranks, via a user interface of accommodation management system 130, their prioritized attributes, which are attributes the guest user indicates to be the most important to them, and accommodation management system 130 stores the ranked prioritized attributes as user preference information in user profile store 230. For example, the user preference information may indicate that a guest user ranked "modern décor" as their most desired attribute and "rural" as their least desired attribute. Further, the user preference information may indicate that a guest user prefers travelling near historical sites or likes to incorporate physical activity into their travel experience. In one embodiment, accommodation management system 130 may store user preference information entered by the guest user via guest client device 120. In another embodiment, accommodation management system 130 may derive user preference information for a guest user based on historical booking information stored for the guest user. For example, historical booking information for a guest user may indicate that all of the bookings associated with the guest user are for listings near ski resorts, and user preference information for the guest user may indicate that the guest user prefers ski-friendly accommodations, such as being near lifts and rental shops.

Accommodation management system 130 also stores historical educational information of guest users in user profile store 230. Historical educational information includes one or more required curriculums the guest user was following during a current or previous time period. Each curriculum describes a set of subjects that a guest user needed to learn about to satisfy a curriculum scope (e.g., educational certification or requirement) and a time period for following the curriculum. For example, a college-aged guest user studying abroad in China may have a curriculum of Mandarin, Chinese history, and economics to complete their junior (3rd) year of college, which the accommodation management system 130 stores in the user profile store 230 with the guest user account for the guest user. Further, the curriculum may include topics and assignments for each subject sequenced by time periods. Continuing with the first example, the guest user's Mandarin course may require for them to cover Chinese characters in the first two weeks of class and write an essay due on the third week. Accommodation management system 130 may also store in user profile store 230 curriculum scopes for the guest user, which is a topic or skill the guest user may want to learn independently from a required curriculum. For example, accommodation management system 130 may store "Chinese pop culture," and "calligraphy" in user profile store 230 for the guest user. Curriculums and curriculum scopes are further described in relation to curriculum module 235.

Accommodation management system 130 also stores group information associated with guest users in user profile store 230. Group information describes other individuals guest users may frequently travel with and group preferences either manually entered to or automatically determined by accommodation management system 130. Group information may include a number of individuals in the group, ages of the individuals, educational requirements and desires, and user preference information for each of the individuals. For example, the group information for guest user Raul may indicate that he typically travels with 3 other individuals, his partner Maria, another guest user of accommodation management system 130, and two children, ages 7 and 12. Further, the group information may indicate whether the group is nomadic (e.g., travels consistently to different locations or follows a nomadic path), historical educational requirements of individuals in the group, and other group preferences, such as safety concerns and medical needs.

Accommodation management system 130 stores destinations in destination store 232. Accommodation management system 130 receives information describing destinations from external sources (e.g., WIKIPEDIA, GOOGLE MAPS, location attraction websites) or databases (e.g., location attraction database) via network 115 or a system administrator. The term destination, as used herein may refer to a place that individuals may visit, including museums, points of interest, educational centers, historical sites, nature preserves, parks, restaurants, and other establishments, attractions, and activities. Some destinations may be referred to as enhanced education destinations, which are meant to augment a required curriculum for an individual, or education destinations, which are meant to help an individual satisfy a curriculum scope. Information about each destination may include information describing the destination, such as the name of the destination, geographic location and/or geographic region (e.g., city, country, or continent) of the destination, a short description of the destination, price to visit the destination, instructions to travel to the destination from major transit centers, reviews of the destination and images of the destination. Accommodation management system 130 also may store attributes describing each destination based on the information. In some embodiments, the accommodation management system 130 determines attributes by performing a syntactic parse of the information of each destination to retrieve characteristics, objects, and keywords as attributes for the destination. For example, destination "Zilker Park" may have attributes "athletic," "river," "field," and "social." Additionally, or alternatively, accommodation management system 130 analyzes images from the information using pattern-matching or computer vision object identification to identify attributes of the destination.

Curriculum module 235 determines and stores information describing curriculums in curriculum store 240. Curriculum module 235 retrieves curriculum scopes from user interface module 290. The term curriculum scope, as used herein, may describe an area of study. Curriculum scopes may indicate an education level (e.g., 4th grade, junior year of high school/11th grade, etc.), a type of degree or certificate (e.g. Bachelors of Arts degree, Certificate in Design Innovation, etc.), skill (e.g., underwater basket weaving, polka dancing, etc.) or a particular topic of interest (e.g., extractive metallurgy, Mandarin, pop culture, etc.). For a new curriculum scope not already stored in curriculum store 240, curriculum module 235 may categorize each curriculum scope into one of more predetermined categories describing a theme of the curriculum scope. For example, curriculum module 235 may categorize curriculum scope "3rd grade" under the category "general education," and curriculum scope "French pastries" under the categories "baking" and "French." In some embodiments, curriculum module 235 also retrieves an education type designation from user interface module 290 along with a curriculum scope. The education type designation indicates whether a guest user wants to study the curriculum scope online, offline, or as a combination of online and offline. For example, the curriculum scope "kindergarten" may be includes with the education designation of "online homeschooling," indicating that the guest user (or another individual in the guest user's group) is planning on satisfying the curriculum scope through homeschooling online.

Further, curriculum module 235 may determine one or more accreditations that can be achieved for a curriculum scope. The term accreditation, as used herein, describes a formal certificate or indication of expertise in a curriculum scope. For example, curriculum module 235 may associate curriculum scope "7th grade" with the accreditation "7th grade certificate" and curriculum scope "French" with the accreditations "French Certificate" and "college course credit," among other accreditations. In some embodiments, curriculum model 235 may associate certain curriculum scopes with travel requirements. Travel requirements indicate geographic regions an individual must visit to satisfy the curriculum scope and/or receive an accreditation for the curriculum scope. For example, a curriculum scope for a study abroad semester may require an individual to visit some new geographic region every month. In another example, to receive a Spanish certification, an individual may need to spend at least a week in a Spanish-speaking country.

To determine categories, accreditations, and travel requirements for curriculum scopes, curriculum module 235 syntactically parses a curriculum scope (or information describing a curriculum scope retrieved from an external source) to find keywords to match to categories, accreditations, and, in some embodiments, education type designations and travel requirements. In other embodiments, curriculum module 235 includes a machine learning model trained on training data including a set of curriculum scopes labelled with categories and accreditations. In some embodiments, the training data also includes labels for any education type designations and travel requirements associated with the curriculum scope. The training data may be manually or automatically labelled. The machine learning model may use this training data to learn which keywords in curriculum scopes correspond to categories and accreditations in a predetermined set. Once trained, the machine learning model receives curriculum scopes as input from user profile store 230. For each inputted curriculum scope, the machine learning model outputs a percentage match of the curriculum scope to each category and accreditation in the predetermined set. Curriculum module 235 may store categories and accreditations with a percentage match over a threshold value in relation to the curriculum scope in curriculum store 240. For example, for a threshold value of 95%, curriculum module 235 stores the category "general education" with a match of 97% in relation to the curriculum scope "kindergarten." In some embodiments, curriculum module 235 uses separate machine learning modules for categories and accreditations.

Curriculum module 235 determines and stores one or more curriculums for each curriculum scope. The term curriculum, as used herein, refers to a set of subjects meant to cover a particular curriculum scope. For example, a curriculum for 4th grade may include math, science, reading, and writing, among other topics. Various curriculums may include similar subjects, and subjects may be specific to an age of an individual following the curriculum. For example, a subject in a 1st grade curriculum (or a curriculum for individuals ages 6 to 7) may be "addition," which is a type of math, while a subject for a 12th grade curriculum (or a curriculum for individuals ages 17 to 18) may be "calculus," another type of math. Subjects in a curriculum may be further divided into assignments or topics based on the curriculum scope, such as "essay on the Revolutionary War" or "Industrialization" for the subject "U.S. History." These subjects, topics, and assignments may be further associated with a sequence in the curriculum, which is an amount of time that should be spent focusing on that portion of the curriculum. The amount of time may be a specific set of time, like particular dates or months, or a relative set of time, such as before or after another subject or a number of days. For example, a curriculum may indicate that an individual should learn about the subject "Physics" in May, the spring, or after the subjects "Chemistry" and "Biology." Subjects may also be associated with standardized tests corresponding to the curriculum scope or an accreditation. For example, the subject "World History" for the curriculum scope "10th grade" may be associated with the standardized test "AP World History test." The standardized tests may be further associated with sequences indicating when the standardized tests are offered and locations where the standardized tests are offered. In some embodiments, the curriculum scope is associated with a standardized test and sequence, for example, the curriculum scope "12th grade" is associated with the standardized test "Scholastic Assessment Test (SAT)," which is available once a month.

In some embodiments, curriculum module 235 uses a category or accreditation of a curriculum scope to determine a suggested curriculum for the curriculum scope. For example, curriculum module 235 may retrieve a curriculum for the accreditation from an outside source to use as the suggested curriculum or use a curriculum of another curriculum scope in the same category. In other embodiments, curriculum module 235 includes a machine learning model that outputs a suggested curriculum for a curriculum scope. The machine learning model is trained on training data including a set of curriculum scopes labelled with sets of subjects comprising curriculums. In some embodiments, the set of curriculum scopes are further labelled with ages for individuals, accreditations, and categories. The training data may be manually or automatically labelled. Once trained, the machine learning model receives curriculum scopes as input from user profile store 230 and outputs a percentage match of the curriculum scope to each subject in the predetermined set of subjects used in curriculums. Curriculum module 235 may store subjects with a percentage match over a threshold value together as a suggested curriculum of the curriculum scope in curriculum store 240, along with an indication that the curriculum was determined using curriculum module 235. In some embodiments, curriculum module 235 ranks the stored subjects by percentage match and uses the ranking to determine sequences for the subjects.

Curriculum module 235 may optimize a suggested curriculum based on a time period retrieved from user interface module 290. Curriculum module 235 may match the sequences and/or standardized tests of the curriculum to the time period or reduce the number of subjects, topics, or assignments in the curriculum to fit the time period. For example, if a guest user indicates that they only have 1 month to spend on a curriculum that includes 10 subjects that usually span from December to October in a year, curriculum module 235 may determine new sequences for the subjects of the curriculum or remove some subject, topics, or assignments to fit the curriculum to the retrieved time period. Further, if the guest user needs to take a standardized test that is only offered in May in the United States, curriculum model 235 will optimize the sequences to prepare the guest user for the standardized test by May. Here, a machine learning model may be applied to optimize a curriculum, for example, by evaluating a time period for study, determining a number of courses and/or subjects necessary to reach a particular level of mastery, determining standardized tests to prepare for and take as part of the curriculum, and evaluating a learning profile, e.g., based on past historical data for the individual and/or an individual of similar learning profile, to generate a curriculum tailored for the individual to complete within the time period noted.

In some embodiments, curriculum module 235 determines a curriculum scope for a required curriculum. A required curriculum is a predetermined curriculum a guest user or individual in the group of the guest user is following. Curriculum module 235 retrieves required curriculums from user interface module 290 and stores the required curriculums in curriculum store 240. Curriculum module 235 may use a machine learning model to determine the curriculum scope of required curriculum. The machine learning model may be trained training data including a set of curriculums labelled with a curriculum scope. The training data may be automatically or manually labelled, and each curriculum may any combination of subjects, topics, and/or assignments for the curriculum. Once trained, the machine learning model receives required curriculums from user profile store 230 as input, outputs a percentage match to curriculum scopes from a set of possible curriculum scopes, and stores curriculum scopes with a percentage match above a threshold value as curriculum scopes of the curriculum in curriculum store 240. In other embodiments, curriculum module 235 retrieves information from an external source about the subjects, assignments, and topics of a required curriculum, such as the typical age an individual learns about the topic or subject or performs the assignment or curriculum scopes that include the subjects, assignments, and topics and uses the information to determine a curriculum scope for the curriculum.

Accommodation recommendation module 250 determines accommodation recommendations based on curriculums. The term accommodation recommendation, as used herein, may refer to a suggestion of one or more accommodations based on a required or suggested curriculum for a guest user (or individual in a group with the guest user). An accommodation recommendation may also include a suggested itinerary of destinations in various geographic regions meant to augment a required curriculum or satisfy a suggested curriculum.

To determine an accommodation recommendation, accommodation recommendation module 250 retrieves information describing a curriculum from curriculum store 240. The information may include the curriculum, topics, assignments, curriculum scopes, categories, accreditations, sequences, ages, travel requirements, education type designation, and standardized tests associated with the curriculum as well as whether the curriculum is required (e.g., entered as user information for the guest user or an associated individual) for a guest user or suggested (i.e., determined by curriculum module 235).

Accommodation recommendation module 250 determines destinations for a curriculum. Accommodation recommendation module 250 retrieves information describing destinations from destination store 232 cross-references the information describing destinations with information describing the curriculum. For a required curriculum, accommodation recommendation module 250 determines a set of destinations that may enhance the required curriculum given constraints retrieved from user interface module 290, such as an age of the individual following the required curriculum, a time period, education type designation, and user profile information. For example, accommodation recommendation module 250 may determine that during the time period, only some of the destinations that correspond to the topic "animals," which is covered during the time period in the required curriculum of a kindergarten student (e.g., a 5 or 6-year-old), are open due to weather or suitable for a student of that age to visit. For a suggested curriculum, accommodation recommendation module 250 determines a set of destinations that satisfy the curriculum over a time period retrieved from the user interface module 290, such as to earn an accreditation associated with the curriculum, prepare for and take a standardized test as part of the curriculum, or cover each of the subjects in the curriculum, all while adhering to the constraints retrieved from the user interface module 290 and constraints regarding the curriculum scope, such as the travel requirements.

In some embodiments, accommodation recommendation module 250 selects, prioritizes, or filters destinations based on the education type designation. In particular, accommodation recommendation module 250 may optimize the destinations to fit local portions of the curriculum with remote, online portions of the curriculum. For example, when the education type designation indicates that the guest user plans to follow the curriculum online or partially online, accommodation recommendation module 250 may narrow the destinations for a curriculum to correspond on more exclusive subjects in the curriculum. For example, accommodation recommendation module 250 may not use destinations for global subjects, like "Calculus" or "Multiplication," and instead focus on destinations for exclusive subjects like "French" or "Chinese History," which may involve more location-based learning than global subjects. Further, if the education type designation indicates that a guest user is homeschooled, accommodation recommendation module 250 prioritizes destinations that include typical school facilities, like an art studio, music room, or gymnasium.

In some embodiments, accommodation recommendation module 250 determines attributes for a curriculum and uses the attributes to determine destinations for the accommodation recommendation. In some embodiments, accommodation recommendation module maps subjects and topics in a curriculum to attributes in an educational attribute table that indicates attributes that are useful in learning various subjects and topics. For example, the subject "conversational German" may map the attributes "interactive" and "multilingual." These attributes indicate that an interactive and multilingual learning environment is recommended for learning how to converse in German. In other embodiments, accommodation recommendation module retrieves information from an external source and/or curriculum store 240 about the curriculum and performs a syntactic parse of the information to determine attributes for the curriculum.

In some embodiments, accommodation recommendation module uses a machine learning model to determine a set of destinations for curriculum. The machine learning model may be trained on destinations labelled with a combination of subjects, topics, assignments, standardized tests, curriculum scopes, ages, accreditations, education type designations, travel requirements, and/or attributes. Once trained, the machine learning model may receive a curriculum and information describing the curriculum from curriculum store 240, such as accreditation, ages, and curriculum scope, and outputs a percentage match to each destination in destination store 232. Accommodation recommendation module selects destinations with percentage matches above a threshold value to comprise the set of destinations.

Accommodation recommendation module groups destinations in the set of destinations by geographic region and selects one or more geographic regions for subsets of the time period based on travel requirements for the curriculum and constraints retrieved from user interface module 290, which may specify a desired amount of travel (i.e., how many geographic regions to visit), the size of a group the user is travelling with, a geographic region, and other parameters around the guest user's travel experience. In some embodiments, accommodation recommendation module selects a geographic region with the most destinations in a group for the entire time period. In other embodiments, accommodation recommendation module further groups the destinations groups based on sequences in the curriculum covered during the time period. For example, if the time period covers March and April, accommodation recommendation module 250 may group destinations related to topics covered in March together and topics covered in April together. Accommodation recommendation module 250 selects geographic regions for subsets of the time period based on the groups. Continuing with the previous example, accommodation recommendation module 250 may select the geographic region with the most destinations corresponding to March for the guest user to go to in March. In further embodiments, accommodation recommendation module 250 further groups the destinations by attributes retrieved from the destination store 232 and selects geographic regions for subsets of the time period corresponding to user preference information retrieved from user profile store 230.

For each selected geographic region and its subset of the time period, accommodation recommendation module 250 retrieves listings available in the geographic region during the subset of the time period from listing store 210. In some embodiments, destinations for the geographic region may include accommodation options, and accommodation recommendation module includes the destinations as listings for the geographic region. Accommodation recommendation module 250 ranks each available listing based on a weighted combination of user preference information retrieved from user profile store 230, listing information retrieved from the listing store, such as user reviews of the listing, and constraints input by the guest user, such as budget. For example, for a user who prefers remote settings and cozy environments, accommodation recommendation module may rank a rustic cabin in the woods higher than a suburban townhouse. In some embodiments, accommodation recommendation module 250 optimizes the accommodation recommendation by determining a distance metric based on physical distance and transit time to each destination from the listing and using the distance metric in the ranking. In other embodiments, accommodation recommendation module 250 ranks the listings based on a combination of user preference information and the distance metric or based on the destinations near the listing that cover particular topics or subjects in the curriculum. In even further embodiments, the recommendation module 250 retrieves user preference information for the host users of the listings and further ranks the listings based on similar interests and experiences between the guest user and the host user. For example, if a guest user is following a curriculum to learn how to cook Mediterranean food, the accommodation recommendation module 250 may rank listings in Greece with host users who indicated they like to cook with their guests higher than other listings.

To optimize the accommodation recommendation, accommodation recommendation module 250 selects the highest-ranked listing for each geographic region and creates and sends the accommodation recommendation to user interface module 290 to receive input from the guest user via a user interface about which listings to book from the accommodation recommendation. The accommodation recommendation may be provided for display on a screen of a computing device in a manner that includes icons representing the selected listings, which may be categorized by geographic region and subset of the time period. Further, the accommodation recommendation may include icons representing the suggested or required curriculum and may list the curriculum in relation to the geographic regions and destinations. In some embodiments, accommodation recommendation module retrieves, from various external sources, suggested travel options between each listing, such as plane or train tickets, and tickets for destinations in the geographic region and provides for display (or presents) icons of the suggested travel options in the user interface on a screen of a computing device.

In some embodiments, accommodation recommendation module determines an itinerary to transmit (or send) with the accommodation recommendation. The term itinerary, as used herein, may refer to an outline of travel of the guest user. Accommodation recommendation module retrieves, from an external source, travel options to take the guest user (and, in some embodiments, the guest user's group) between each listing and specific times and dates for travelling between destinations and/or listings to satisfy the curriculum. For example, an itinerary for the suggested curriculum to complete lifeguard training may indicate which days a user may needs to be at Bondi Beach for a CPR class. In another example, an itinerary for augmenting the required curriculum for a 10th grade student studying Italian history may indicate to spend a first morning at the Vatican in the Rome area, followed by a tour of the city of Rome via a popular walking tour group. In other embodiments, accommodation recommendation module 250 determines an accommodation recommendation for each sequence of the curriculum and creates an itinerary comprising each of the accommodation recommendations.

Accommodation recommendation module 250 transmits (or sends) the accommodation recommendation in a user interface to the guest user for input. The user interface may also include interactive maps between destinations and/or listings, interactive maps of restaurants, stores, and transit options near each listing, and a drop-down menu that indicates criteria for ranking the listings. Accommodation recommendation module may receive, via the user interface, a user selection from the drop-down menu to update the accommodation recommendation by reranking and reselecting listings based on specific criteria, including user preference information. Accommodation recommendation module 250 may re-rank the listings for each geographic region based on the specific criteria, and command user interface module 295 to automatically update the icons on the user interface to reflect a new accommodation recommendation based on the re-ranked listings.

Accommodation recommendation module 250 receives, from user interface module 290, input from the user interface indicating a selection of the listings for booking. For example, the input may indicate that the guest user only wants to book the listing for the first subset of the time period, so accommodation recommendation module 250 only selects that listing for booking. In some embodiments, the input may indicate that the guest user would like to book an itinerary presented with the accommodation recommendation, including travel options, destination tickets, and/or restaurant reservations.

Booking module 290 may be configured to book listings from accommodation recommendations. Booking may include securing a reservation and/or access to an accommodation or other activity. Booking module 290 retrieves selected listings from accommodation recommendation module 250 and retrieves information describing the listings from listing store 210. In some embodiments, booking module 290 auto-books listings of an accommodation recommendation for a guest user. Booking module 290 creates a new booking in booking store 220 using the listing, the subset of the time period, guest user information from the guest user account (e.g., accommodation preferences, payment details), and information from the listing store. In some embodiments, booking module 290 populates the data structure of booking store 220 for the listing with user account data for the guest user.

Booking module 260 also may be configured to book other aspects of an itinerary from an accommodation recommendation. Booking module retrieves a selected itinerary from accommodation recommendation module 250 and may book each listing in the itinerary. Booking module 260 also interacts with external management systems to book tickets for destinations in the itinerary. For example, booking module 260 may book a spot in a cooking class, book tickets for a group of 3 kids and 1 adult to go to the Museum of Modern Art, or 1 room on a 3-day cruise in Alaska. Further, booking module may also book, via external management systems, the travel options suggested with the itinerary to transport the guest user between destinations and/or listings and restaurant reservations, when requested by the guest user. Booking module 260 stores the booked itinerary in itinerary store 270 in relation to the user and confirmations of each booking via external management systems. In some embodiments, booking module 260 automatically books listings of an itinerary selected by the guest user when a corresponding sequence in the curriculum is within a threshold amount of time from a current time.

In some embodiments, booking module 260 also creates community groups of guest users following similar curriculums in the same or nearby geographic regions during overlapping time periods. Similar curriculums may map to the same locations, include the same attributes, or have the same or similar curriculum scopes. In some embodiments, booking module 260 may set up in-person or online meet ups for guest users following the same or similar curriculums to provide opportunities for socialization among guest users. For example, booking module 260 may create a class of guest users following the same or a similar curriculum to enable the guest users to make friends, work in groups, and give presentations to one another or do group projects together as assignments. Further, booking module 260 may create community groups of guest users based on age. For example, booking module 260 may group guest users with homeschooled children ages 5 to 10 together into one community group and guest users with homeschooled teenagers ages 13 to 18 in another community group.

Update module 280 may be configured to monitor (e.g., via location tracking) a guest user's progress through an itinerary as the guest user travels. Update module 270 monitors the status of the geographic regions in the itinerary to determine if any travel options need to be automatically rebooked, for example due to weather conditions or safety concerns based on a location tracked information for the guest user. Further, update module 270 monitors the status of destinations in the itinerary in case of unexpected closures or cancellations of bookings for the destinations. When a booking in an itinerary is cancelled or otherwise needs to be updated, update module 270 automatically retrieves a new travel option from an external source or a new destination related to the curriculum in the geographic region and creating new booking to replace the canceled booking. In embodiments where the new travel option changes the dates the guest user is in a geographic region, update module 270 also changes the bookings for listings to conform to the changes in bookings. Update module 270 updates the itinerary in itinerary store 270 to reflect the new bookings.

In some embodiments, update module 280 also may be configured to transmit quizzes corresponding to subjects and topics being covered during a current time period of an itinerary via user interface of user interface module 290.

Update module 270 may retrieve these quizzes from a system administrator or external source. Based on results of a quiz taken by a guest user via the user interface, update module 270 may automatically alter to the itinerary and re-optimize the itinerary to focus on the subjects and topics the guest user is not scoring well on in the quizzes. Further, update module 270 may optimize the itinerary to extend the coverage of the deficient subjects and topics while still satisfying the curriculum scope within the entire time period. For example, if a guest user receives 35% on quiz about the Roman Empire while travelling in Italy, update module 270 may extend the portion of the itinerary corresponding to Rome by booking new listings in Rome, cancelling and/or shifting bookings for subsequent listings, readjusting subsequent destinations to cover the remaining subjects and topics more efficiently, and adding more history museum destinations relating to the Roman Empire to the itinerary.

User interface module 290 may be configured to generate (or create) user interfaces to provide for display (e.g., transmit to display on) to the host client device 110 and/or guest client device 120. Such user interfaces may show information describing listings and bookings, accommodation recommendations, user profile information, itineraries, geographic regions, curriculums, community groups, and other information stored by accommodation management system 130. In some embodiments, user interface module 290 may show information describing how many other guest users have booked an itinerary for the same curriculum and/or the same destinations during an overlapping time period or may show popularly booked itineraries for curriculum scopes that a guest user can automatically book via the user interface. User interface module 290 may retrieve requests and information inputted via host client device 110 and/or guest client device 120, such as user profile information, user preference information, a required curriculum, or a desired curriculum scope. In some embodiments, user interface module 290 facilitates sending information between guest users in the same community group, such as through messages and video chats. Example user interfaces are described in relation in FIGS. 4-9.

User interface module 290 transmits and receives indications from host client device 110. User interface module 290 may transmit indications to host client device 110 that a guest user has booked a listing for a time period or that a guest user has canceled a booking. User interface module 290 also may transmit requests for input for display to guest client device 120. User interface module 290 may receive an accommodation recommendation from accommodation recommendation module 250. User interface module 295 transmits the accommodation recommendation to provide for display on guest client device 120 and receives a selection of one or more listings, travel options, and/or destination tickets to book. In some embodiments, user interface module 290 may receive an indication from guest client device 120 that the guest user has rejected the accommodation recommendation, and user interface module 290 may request a new accommodation recommendation to send to guest client device 120. User interface module 290 may transmit a command to booking module 260 to book selections or may transmit the selections back to accommodation recommendation module 250. In some embodiments, update module 270 may automatically book a listing for a guest user in response to a booking cancelation, so the user interface module 290 may send an indication to guest client device 120 that a new booking was made to replace the canceled booking. Further, user interface module 290 may transmit indications reminding the guest user of upcoming bookings in an itinerary.

Example Destination Mappings

Figure 3A:
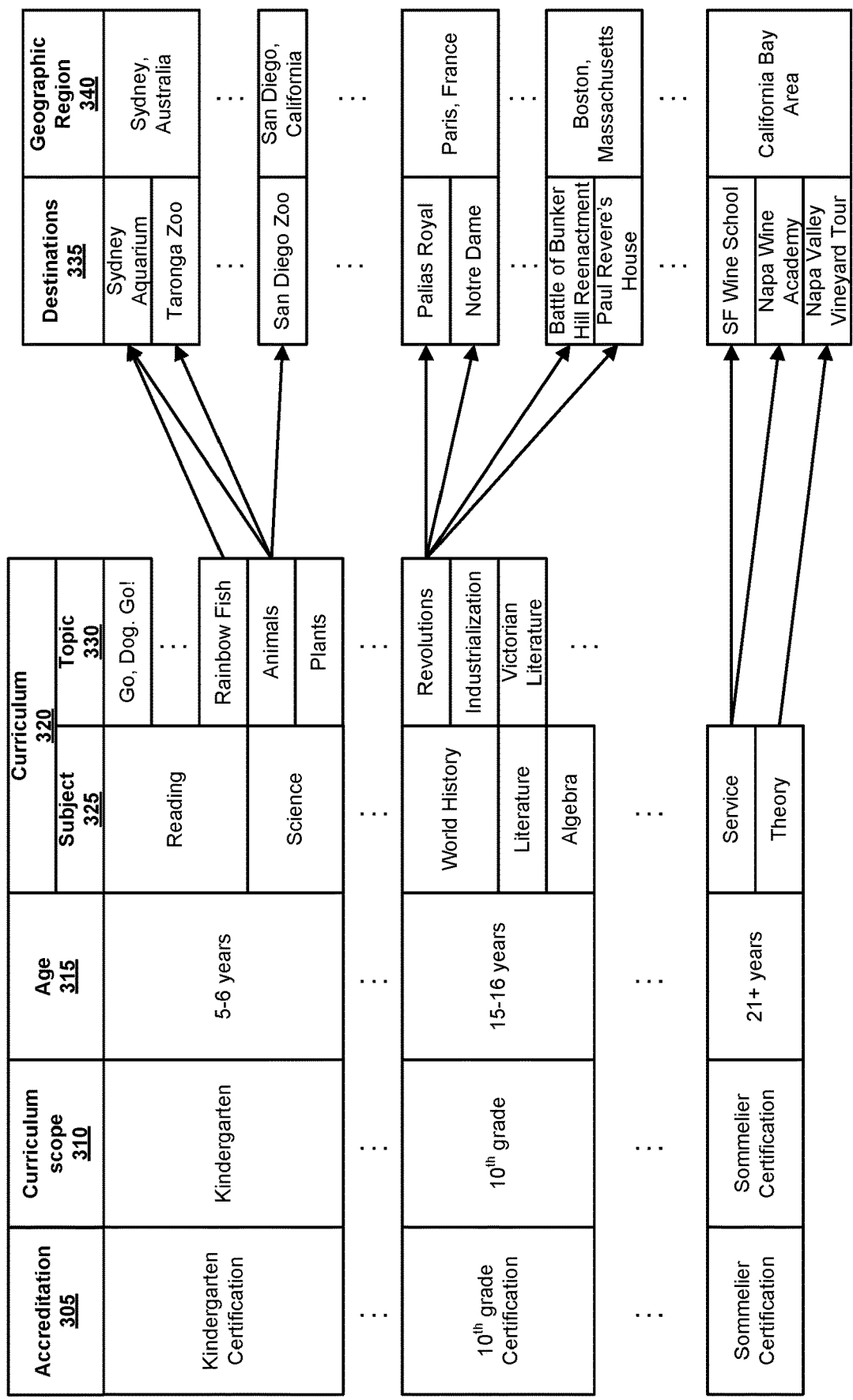
Figure 3C:
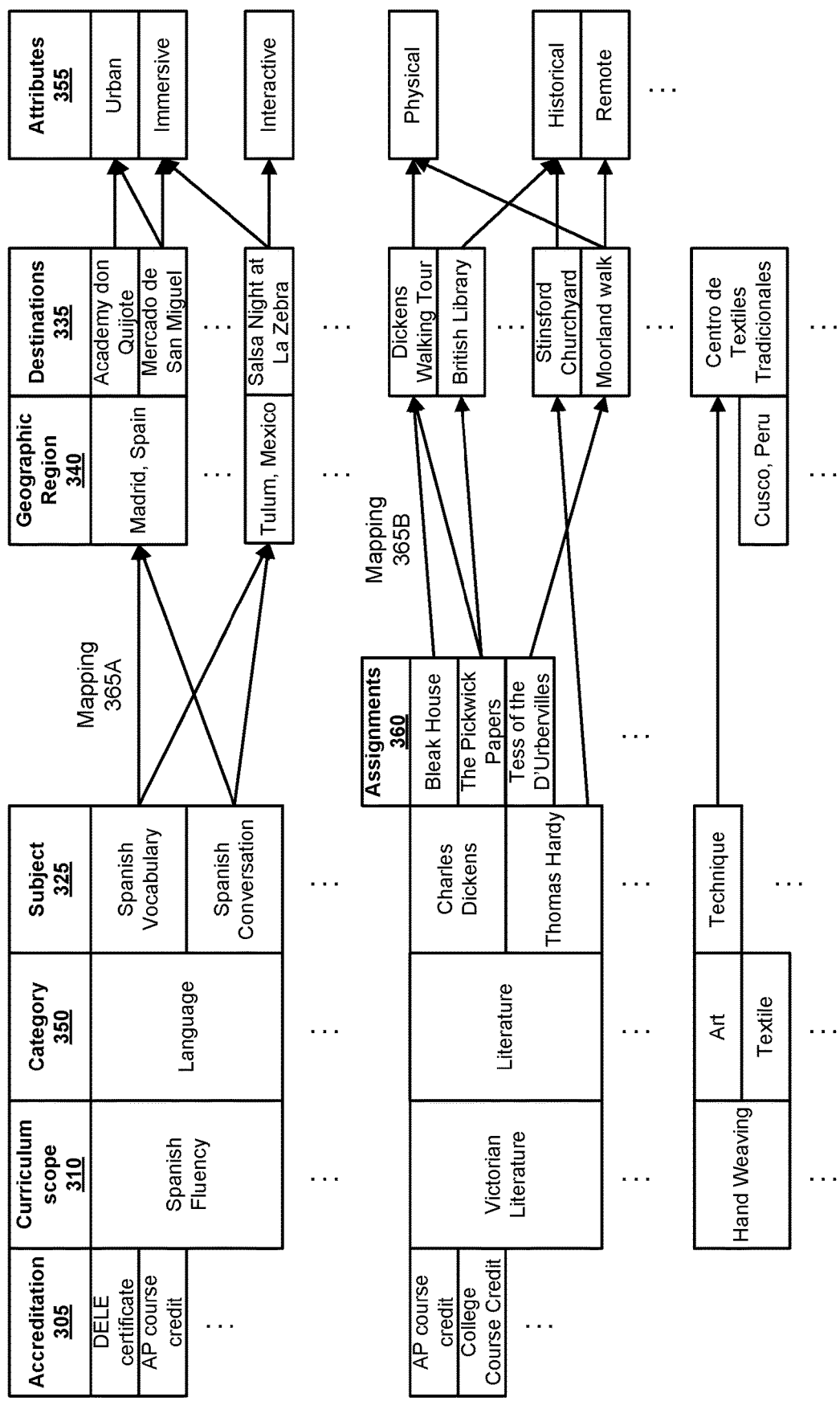

FIGS. 3A-3C illustrates examples of mappings between curriculums and destinations, according to one embodiment. In some embodiments, accommodation recommendation module 250 creates mapping between curriculums and destinations based on other information retrieved from curriculum store 240, destination store 232, and/or user profile store 230.

FIG. 3A illustrates example relationships between accreditations 305, curriculum scopes 310, ages 315, and curriculums 320, which may include subjects 325 and topics 330 (collectively referred to as curriculum information for simplicity), according to one example embodiment. A guest user may input an accreditation 305, curriculum scope 310, and/or age 315 via a user interface from user interface module 290, and accommodation recommendation module 250 determines a corresponding curriculum. For example, a guest user may indicate that they live a nomadic lifestyle with their family, which includes a child of age 315 5 years old who has a required curriculum. Based on this information, curriculum module 235 may determine the required curriculum based on the child's age 315, or the guest user may enter the required curriculum as a curriculum 320 via the user interface. Accommodation recommendation module 250 maps the curriculum to enhanced education destinations 335 that would augment the educational experience of the child as they travel with their family. For example, the curriculum 320 for the child may include the subject 325 "science," which further includes the topic 330 "animals." Accommodation recommendation module 250 determines destinations that involve animals that would be suitable for the child, such as the destinations 335 "Taronga Zoo" or "Sydney Aquarium." These destinations 335 are located in geographic region 340 "Sydney Australia." Based on the mapping, accommodation recommendation module 250 may select a destination to send the family to enhance the child's learning experience, and booking module 260 may automatically book a listing at the destination, along with other related services at the destination, for example, a car service from the airport to the listing. Further, some enhanced education destinations may cater to homeschooled children. These enhanced education destinations provide access to specialized forms of education that a homeschool child may not have access to while traveling, including typical school facilities such as art studios, music rooms, gyms, and libraries.

Likewise, a guest user seeking a sommelier certification may select a curriculum scope 310 of "Sommelier Certification" and accommodation management system 130 may confirm appropriate of the guest user (e.g., via guest user account details) as being age 315 21 or older based on an age 315 associated with the curriculum scope 310. Accommodation management system 130 also may be configured to receive input from the guest user as to whether they seek a curriculum 320 for certification for use in service industry and/or theory and based on the selection or selections map that to an appropriate destination 335 (e.g., SF Wine School and/or Napa Valley Vineyard Tour) in geographic regions 340 of the California Bay Area. Accordingly, accommodations and other travel arrangements (e.g., car service) may be booked by booking module 260 to enable access to the programs and provide for completion within a time period that may be specified. In some embodiments, booking module 260 uses machine learning with the historical booking information to accordingly select a listing and other travel arrangements. For example, booking module 260 may determine, based on historical booking information, that the guest user prefers visiting vineyards that produce around red wine over white wine. Further detail on mapping for curriculum scope "Sommelier Certification" in described in references to FIG. 6.

FIG. 3B illustrates example relationships the curriculum information and sequences 345, according to one example embodiment. In this embodiment, each topic 330 of a curriculum 320 corresponds to a sequence 345, which may be a month or other time period or may indicate the order an individual would learn about the topics 330 in while following a curriculum 320. Accommodation recommendation module 250 may use the sequences 345 when determining destinations 335. For example, if the guest user with the 5-year-old child has specified that they are traveling in August, accommodation recommendation module 250 may recommend destinations 335 corresponding to topics 330 "Go, Dog. Go!" and "animals" since they are covered by the child's curriculum 320 in sequence 345 "August." In another example, if a guest user has specified an interest in curriculum scope 310 "Sommelier Certification" for a time period of travel, accommodation recommendation module 250 may recommend destinations 335 corresponding to subject "service" for the first portion of the time period and destinations corresponding to subject "theory" for a second portion of the time period based on the sequences 345.

FIG. 3C further illustrates example relationships between curriculum information and destinations 335, according to one embodiment. As shown in the figure, accommodation recommendation module 250 may map subjects 325 to geographic regions 340 to determine destinations 335 for the subjects 325. For example, accommodation recommendation module 250 creates a mapping 365A between subject "Spanish vocabulary" 325 and geographic region 340 "Madrid, Spain," where Spanish is predominantly spoken.

Curriculum information may further include assignments 360, which are required work given for a subject 325 or topic 330 in a curriculum 320. Accommodation recommendation module 250 may map assignments 360 to destinations 335 relating to the assignments. For example, accommodation recommendation module 250 creates a mapping 365B between assignment 360 "Bleak House," a novel by Charles Dickens, and destination "Dickens Walking Tour."

As shown in FIG. 3C, accommodation recommendation module may associate accreditations 305 with curriculum scopes 310. A guest user may enter a curriculum scope 310 they are interested in learning about via a user interface, and accommodation recommendation module 250 may determine and recommend, via an accommodation recommendation, an accreditation 305 they may receive while learning about the curriculum scope 310. For example, a guest user interested in curriculum scope 310 "Spanish fluency" could pursue accreditation 305 "DELE certificate" or receive accreditation 305 "AP course credit." Accommodation recommendation module 250 may determine one or more destinations and, subsequently, one or more listings to book for the user to earn the accreditation 305 associated with the curriculum scope 310 as they travel. In some embodiments, guest user may indicate, via the user interface, that they do not want to pursue or receive an accreditation 305, so accommodation recommendation module 250 will not use accreditations 305 in determining destinations for the guest user. Further, some curriculum scopes 310, like curriculum scope 310 "hand weaving," may not be associated with any accreditations 305.

Example User Interfaces

Figure 4:
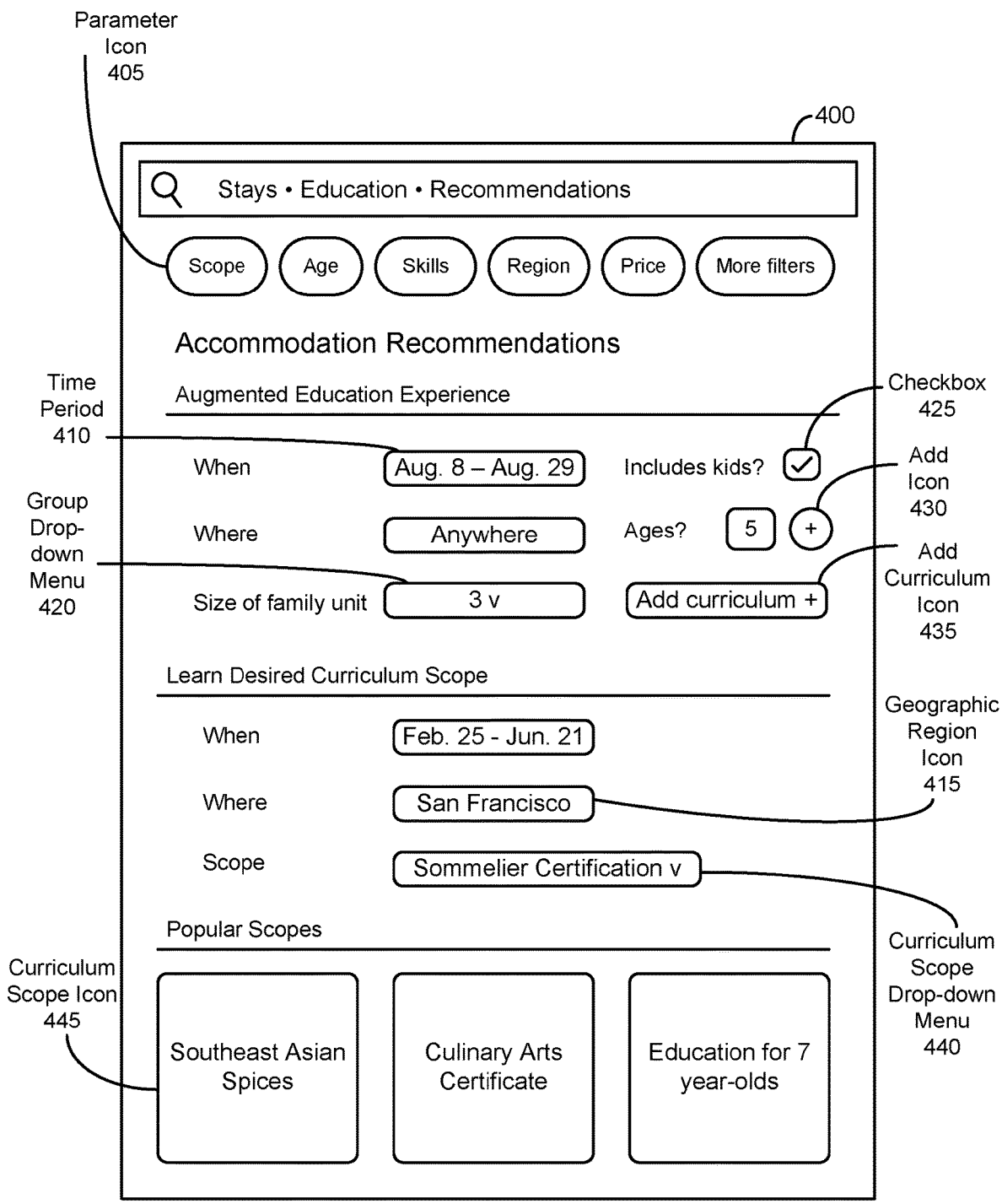
FIG. 4 illustrates an example user interface illustrating accommodation recommendation requests, according to one embodiment.

FIG. 4 illustrates an example user interface 400 illustrating accommodation recommendation requests, according to one embodiment. The user interface 400 includes one or more parameter icons 405, which a guest user may interact with on a guest user client device to indicate a desired curriculum scope, age range, skills, geographic region, and price, among other parameters that may be used to filter what accommodation recommendations module 250 uses as user preferences to determine destinations for an accommodation recommendation.

A guest user may request via the user interface 400 an accommodation recommendation for augmenting an education experience. The guest user may enter a time period 410 that they want to travel for and a geographic region 415 to travel in. The guest user may interact with a group drop-down menu 420 to indicate the size of their family unit travelling with them, a checkbox 425 to indicate whether the family unit includes children, and an add icon to add more children's ages as input for the request. Accommodation management system 130 stores this information in user profile store 230 as group information. Further, the guest user may interact with an add curriculum icon 435 to enter a curriculum or curriculum scope for an individual in the family unit. In some embodiments, the user interface 400 also includes a checkbox 425 or other icon that allows the guest user to indicate whether their family unit is nomadic or not. If so, accommodation management system 130 stores information as group information for the guest user in user profile store 230. In further embodiments, accommodation management system 130 may automatically determine accommodation recommendations for nomadic groups and may automatically book the listings of the accommodation recommendation based on the required curriculum (or, in some embodiments, required curriculums) for each nomadic group.

A guest user may also request an accommodation recommendation for learning a desired curriculum scope via the user interface 400. The guest user may enter a time period 410 that they want to travel for and a geographic region 415 to travel in. The guest user may also interact with a curriculum scope drop-down menu 440 to indicate a desired curriculum scope they would like to learn about or accreditation they would like to earn. In some embodiments, the guest user may enter other parameters, such as the size of a group they plan on travelling with and ages of individuals in the group. In further embodiments, user interface 400 may include other interactive widgets for a guest user to interact with user interface 400 on a screen of a computing device.

Figure 5:
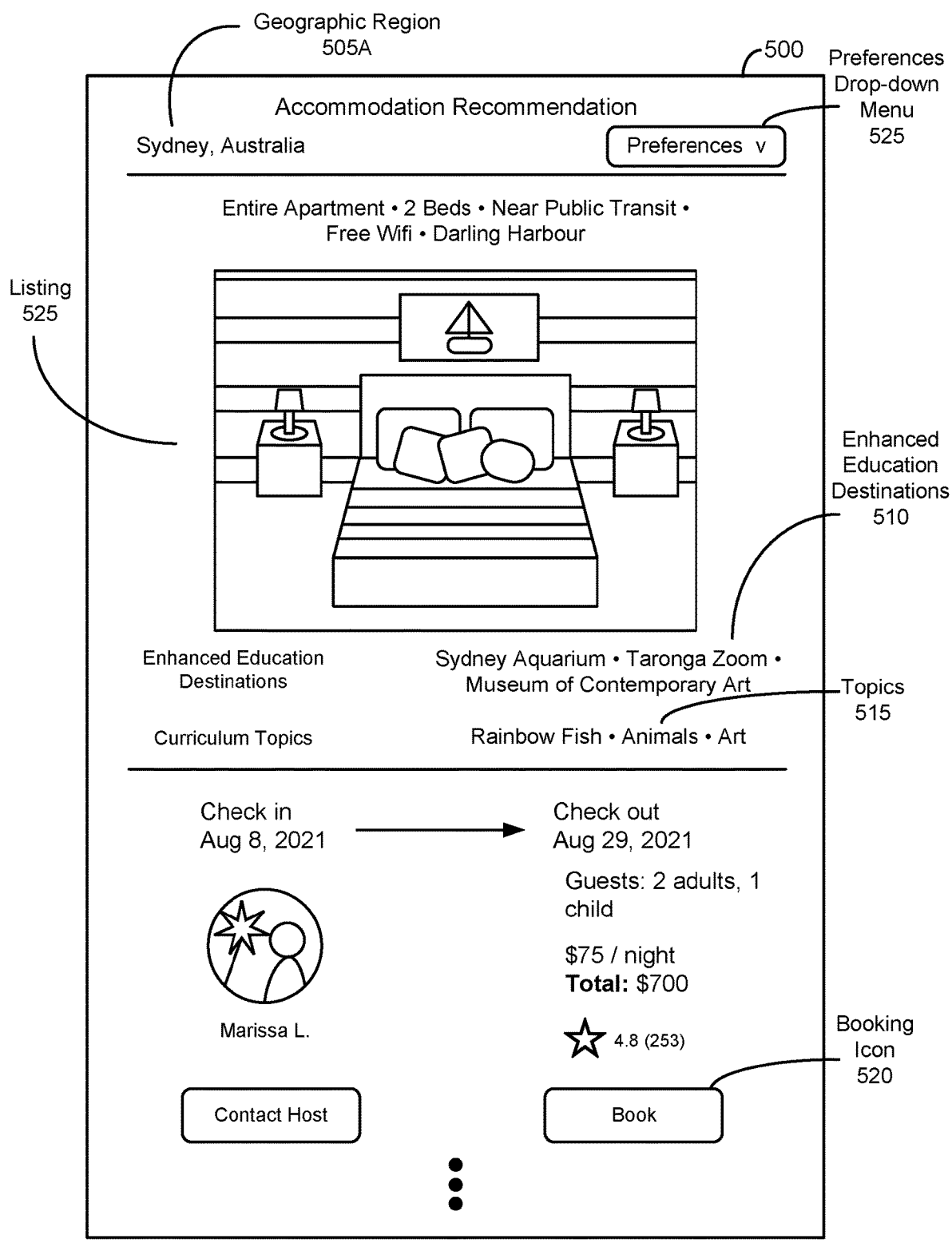
FIG. 5 illustrates an example user interface showing an accommodation recommendation for an augmented education experience, according to one embodiment.

FIG. 5 illustrates an example user interface 500 showing an accommodation recommendation for an augmented education experience, according to one embodiment. The accommodation recommendation indicates a recommended geographic region 505A and a listing 525, represented by information retrieved from listing store 210, such as images, descriptions, and price. In this embodiment, the accommodation recommendation only includes one listing 525, but in other embodiments the accommodation recommendation may include multiple listings for a guest user to choose from or multiple listings for different time periods and geographic regions. The accommodation recommendation also includes enhanced education destinations 510A that are located in the geographic region 505A and may augment a required curriculum and topics 515 covered in the curriculum required curriculum during a time period of the request that pertain to the enhanced education destinations 510. The guest user may interact with booking icon 520 to book the listing 525 or may indicate criteria for the accommodation recommendation via the preferences drop-down menu 525, which accommodation recommendation module 250 will use to re-rank the listings and produce a new accommodation recommendation. In some embodiments, user interface 500 may include other interactive widgets for a guest user to interact with user interface 500.

Figure 6:
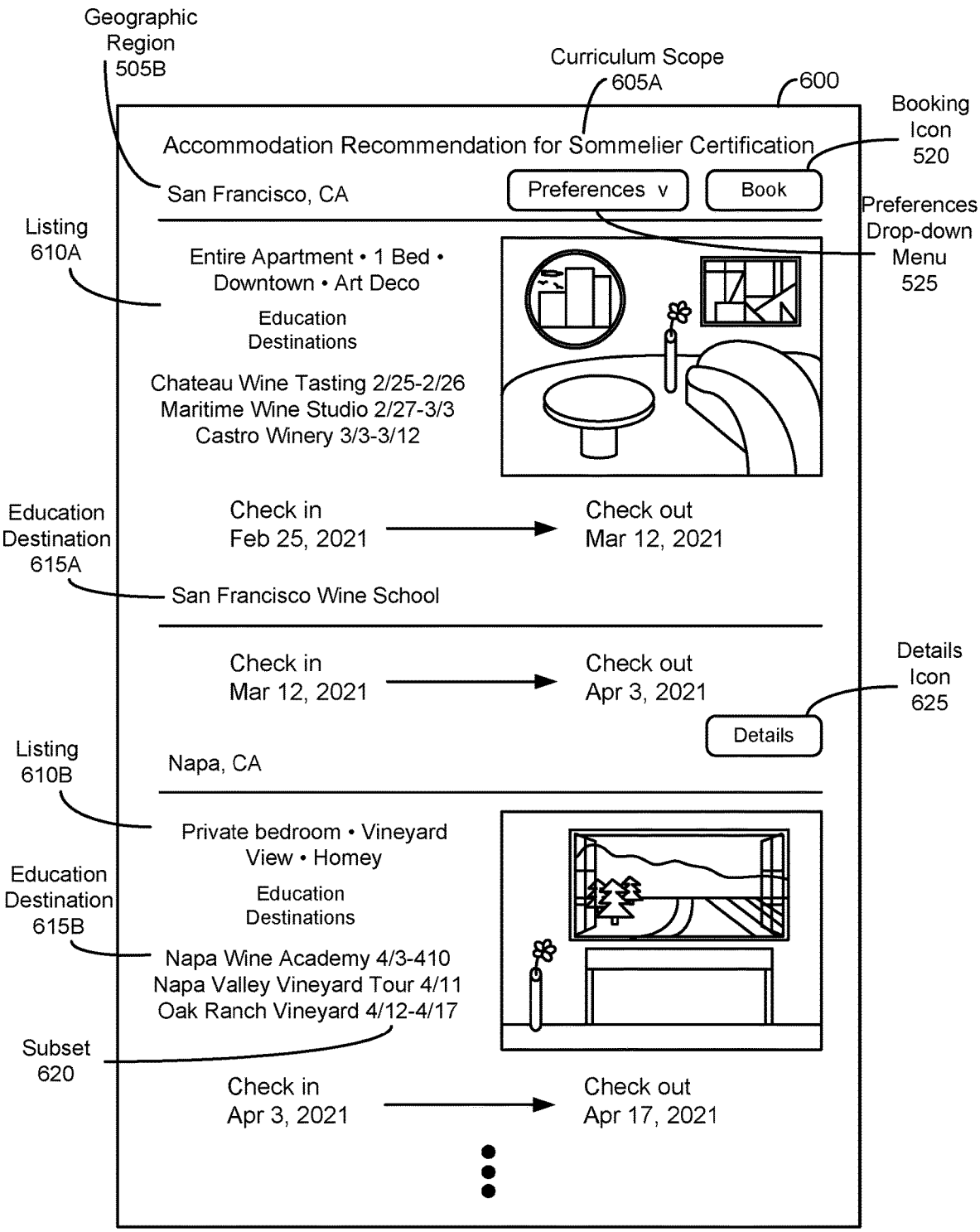
FIG. 6 illustrates an example user interface showing an accommodation recommendation for satisfying a curriculum scope, according to one embodiment.

FIG. 6 illustrates an example user interface 600 showing an accommodation recommendation for satisfying a curriculum scope, according to one embodiment. The accommodation recommendation includes 2 listings 610, each represented by information retrieved from listing store 210, such as images and descriptions. The accommodation recommendation also includes education destinations 510A that the guest user may go to in order to satisfy curriculum scope 605A "Sommelier Certification," like those mapped in FIG. 3A-3B. The education destinations may be listed with a listing 610B, like education destination 615B "Napa Wine Academy," or may be listed in the accommodation recommendation like a listing if the education destination 615 includes accommodations, like education destination 6120A "San Francisco Wine School." Further, each education destination 615 may be associated with a subset 620 of the time period entered by the guest user. The guest user may interact with booking icon 520 to book the listing of the accommodation recommendation or may interact with details icons 625 to view more information about a listing 610 or education destination 615. The guest user may also indicate criteria for the accommodation recommendation via the preferences drop-down menu 525, which accommodation recommendation module 250 uses to re-rank the listings and produce a new accommodation recommendation. In some embodiments, user interface 600 may include other interactive widgets for a guest user to interact with user interface 600.

Figure 7A:
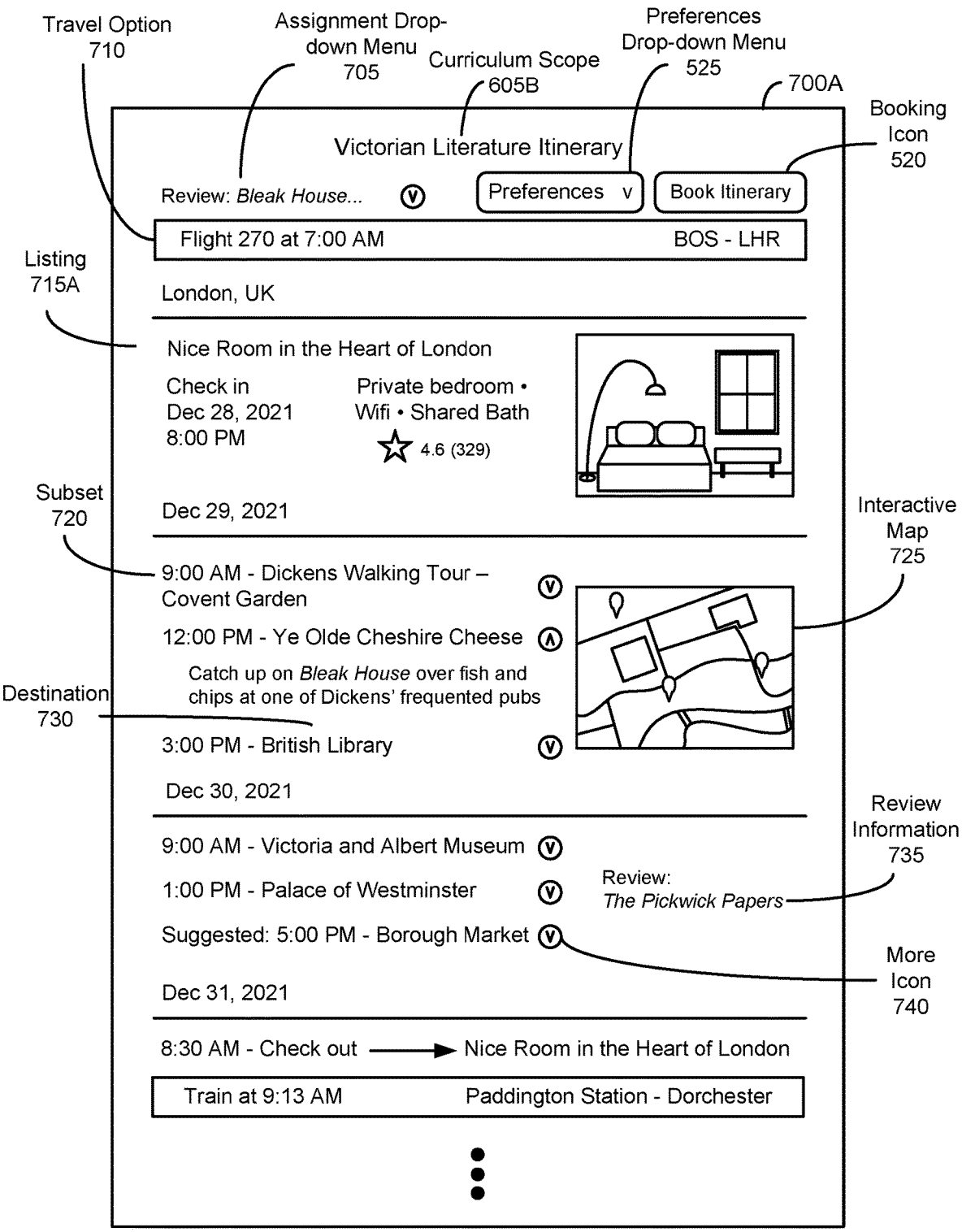

FIGS. 7A-7B illustrate example user interfaces showing an itinerary of an accommodation recommendation, according to one embodiment. In this embodiment, accommodation recommendation module 250 determined the accommodation recommendations for curriculum scope 605B "Victorian Literature" and uses destinations 730 mapped from curriculum scope "Victorian Literature," as shown in the mappings of FIG. 3C. The itinerary indicates a route planned for the guest user to follow on a trip focused on curriculum scope 605B "Victorian Literature" and includes listings 715, destinations 730, and travel options 710. Each destination 730 is also associated with a subset 720 of time indicating when the guest user should be at the destination 730 during the trip. By interacting with booking icon 520, the guest user may instruct booking module 260 to book the listings 715, travel options 710, and tickets for destinations 730 in the accommodation recommendations.

As shown in FIG. 7A, the example user interface 700A includes an assignment drop-down menu 705, which lists assignments that the guest user will need to complete for the curriculum scope 506B. The guest user may interact with the assignment drop-down menu 705 to view the assignments. Further, destinations 730 or subsets 720 of time in the itinerary may be associated with review information 735 indicating which assignments the guest user should complete before reaching that portion of the itinerary.

The user interface 700A include other widgets the user can interact with to receive supplemental information for the itinerary. Such widgets include interactive maps 725, which may show the geographic locations of destinations 730 in the itinerary or a route between destinations 730 using one or more travel options 710, and more icons 740, which the guest user may interact with to see more information about a destination 730. Further, the guest user may indicate criteria for the itinerary of the accommodation recommendation via preferences drop-down menu the 525, which accommodation recommendation module 250 uses to re-rank the listings and produce a new accommodation recommendation.

FIG. 7B shows an example user interface 700B including the rest of the itinerary for curriculum scope 605B "Victorian Literature" not shown in FIG. 7A. The guest user may interact with less icons 745 to view less information about destinations 730 and with the edit icon 755 to manually edit the itinerary or enter new parameters. Further, the accommodation recommendation a summary 750 that encompasses learning objectives for the trip and a price 760 for booking the itinerary. In some embodiments, user interface 700 may include other interactive widgets for a guest user to interact with user interface 700.

Figure 8:
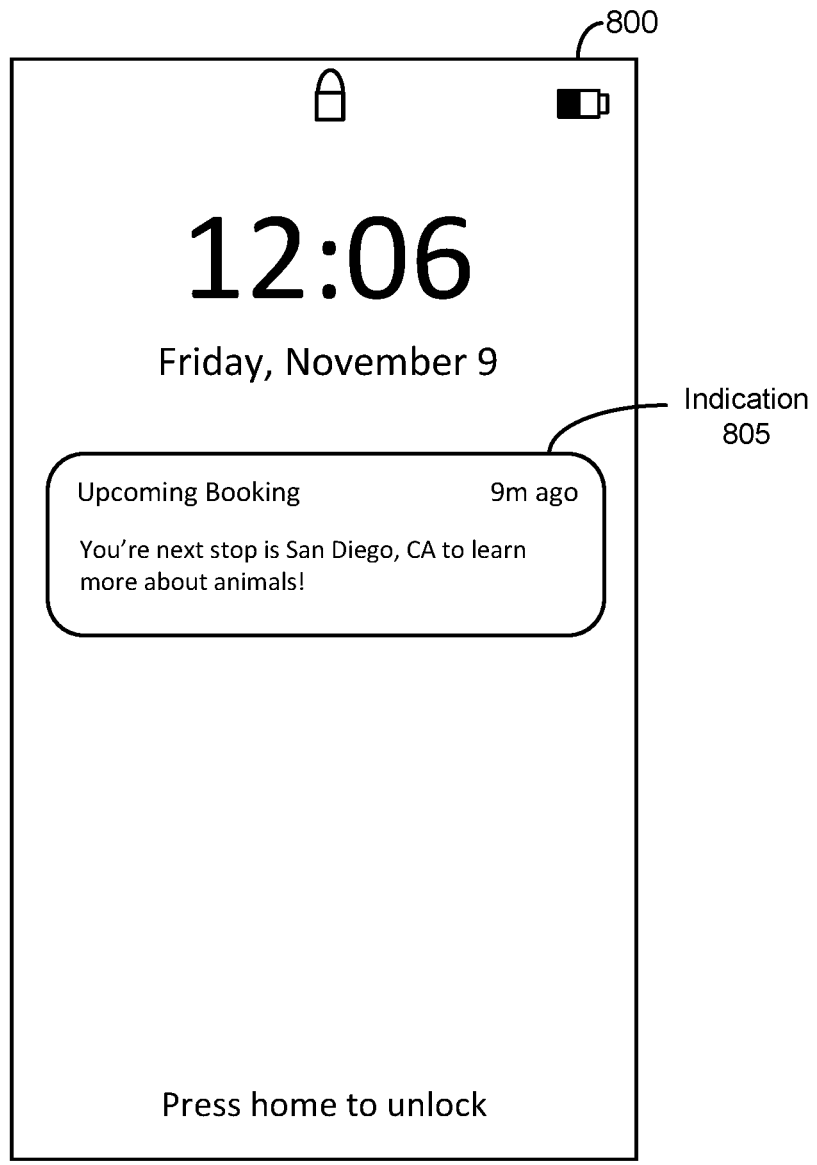
FIG. 8 illustrates an example user interface with an indication for an upcoming booking, according to one embodiment.

FIG. 8 illustrates an example user interface with an indication for an upcoming booking, according to one embodiment. In this example, the indication 805 (also referred to as a notification) is shown on a lock screen 800 of guest client device 120. The indication 805 indicates that a guest user has an upcoming listing booked in San Diego corresponding to the topic "animals" from a curriculum, as described in relation to FIG. 3A. In some embodiments, the guest user may interact with the notification 805 to view the listing.

Figure 9:
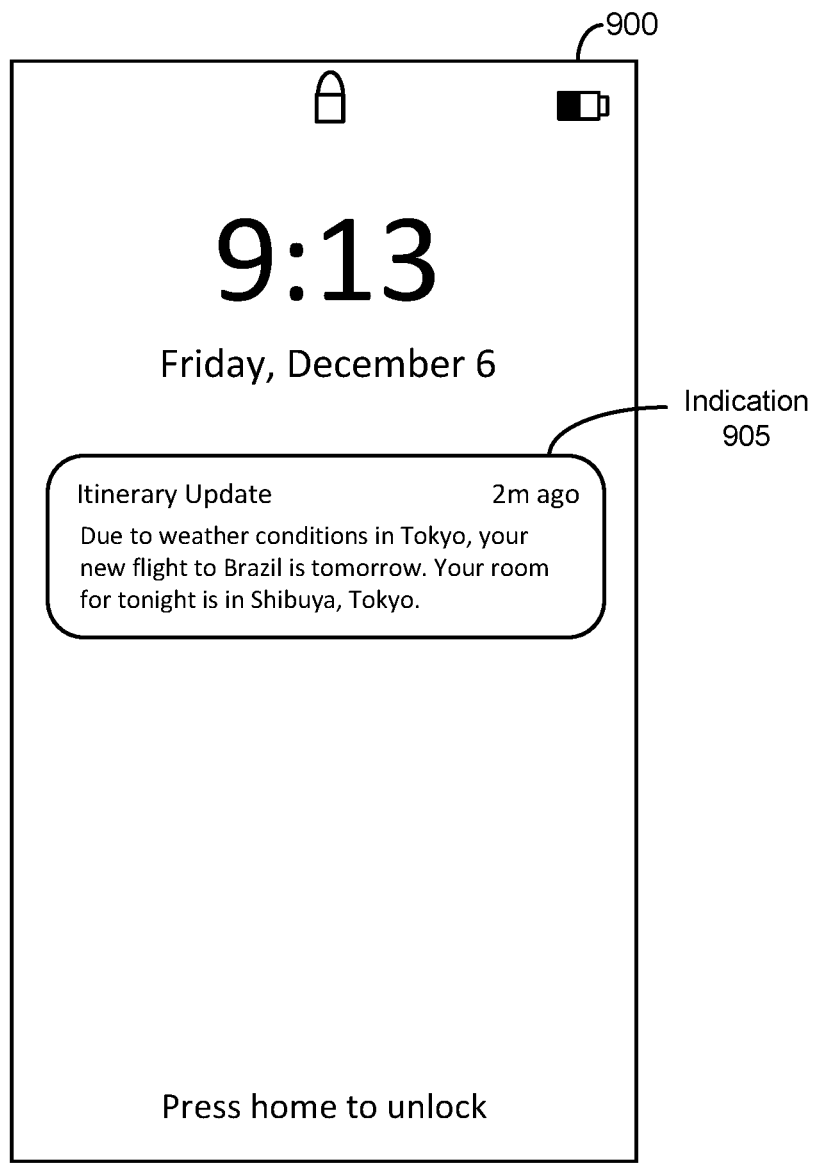
FIG. 9 illustrates an example user interface with an indication for an update to an itinerary, according to one embodiment.

FIG. 9 illustrates an example user interface with an indication for an update to an itinerary, according to one embodiment. In this example, the indication 905 (also referred to as a notification) is shown on a lock screen 900 of guest client device 120. The indication 905 indicates that accommodation management system 130 has updated the itinerary the guest user is following due to weather conditions by picking a new travel option and booking a new listing. In some embodiments, accommodation management system 130 may update the itinerary due safety conditions, destination closures, and/or booking cancelations.

Computing Machine Architecture

Figure 10:
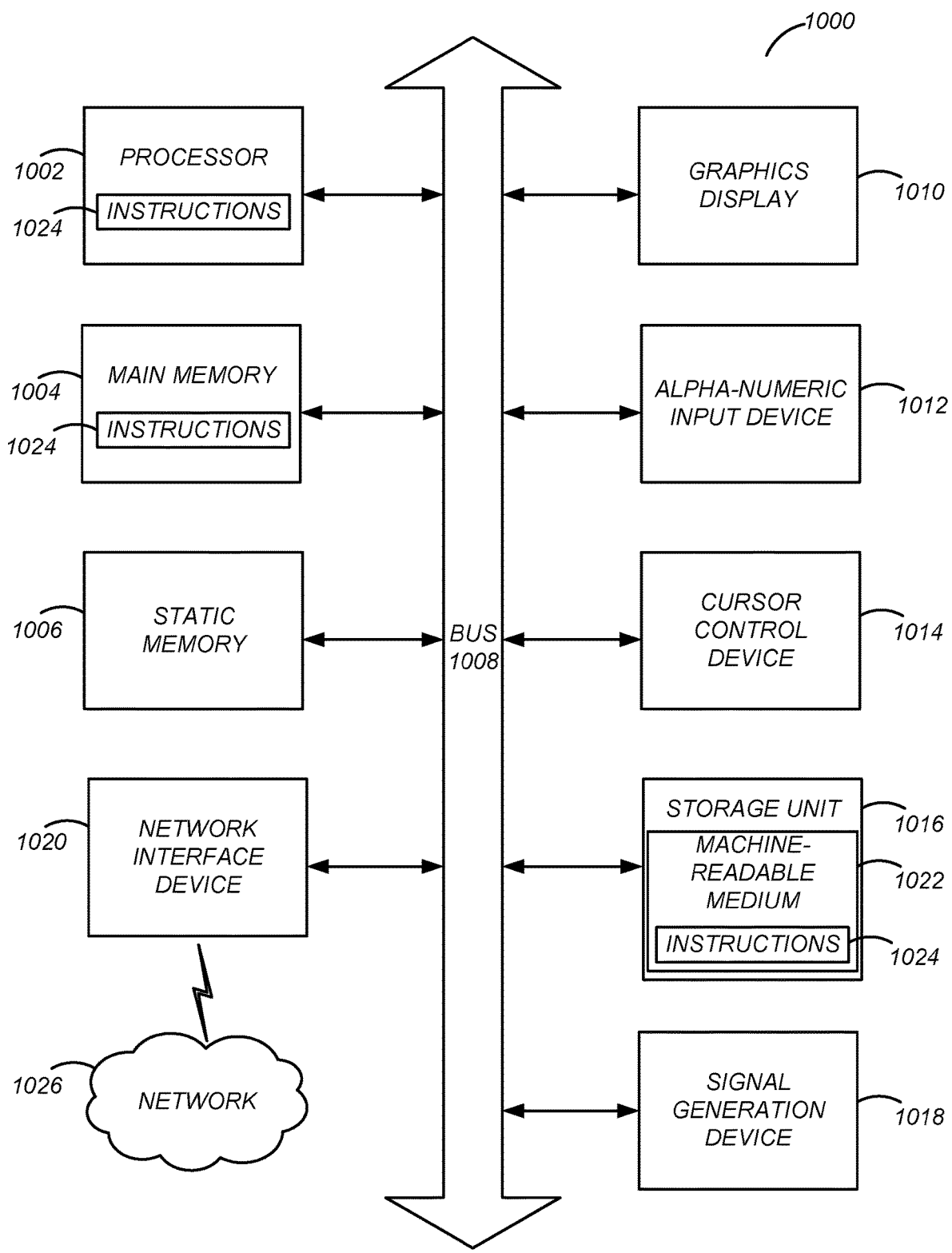
FIG. 10 is a block diagram illustrating components of an example machine able to read instructions from a machine-readable medium and execute them in a processor (or controller).

FIG. 10 is a block diagram illustrating components of an example machine able to read instructions from a machine-readable medium and execute them in a processor (or controller). Specifically, FIG. 10 shows a diagrammatic representation of a machine in the example form of a computer system 1000 within which program code (e.g., software) for causing the machine to perform any one or more of the methodologies discussed herein may be executed. The program code may be comprised of instructions 1024 executable by one or more processors 1002. In alternative embodiments, the machine operates as a stand-alone device or may be connected (e.g., networked) to other machines. In a networked deployment, the machine may operate in the capacity of a server machine or a client machine in a server-client network environment, or as a peer machine in a peer-to-peer (or distributed) network environment. It is noted that the host client device 110, the guest client device 120, and/or the accommodation management system 130 may have a subset or all of the components described of computer system 1000.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 1024 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 1000 includes a processor 1002 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 1004, and a static memory 1006, which are configured to communicate with each other via a bus 1008. The computer system 1000 may further include visual display interface 1010. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 1010 may include or may interface with a touch enabled screen. The computer system 1000 may also include alphanumeric input device 1012 (e.g., a keyboard or touch screen keyboard), a cursor control device 1014 (e.g., a mouse, a trackball, a joystick, a motion sensor, or other pointing instrument), a storage unit 1016, a signal generation device 1018 (e.g., a speaker), and a network interface device 1020, which also are configured to communicate via the bus 1008.

The storage unit 1016 includes a machine-readable medium 1022 on which is stored instructions 1024 (e.g., software) embodying any one or more of the methodologies or functions described herein. The instructions 1024 (e.g., software) may also reside, completely or at least partially, within the main memory 1004 or within the processor 1002 (e.g., within a processor's cache memory) during execution thereof by the computer system 1000, the main memory 1004 and the processor 1002 also constituting machine-readable media. The instructions 1024 (e.g., software) may be transmitted or received over a network 1026 via the network interface device 1020.

While machine-readable medium 1022 is shown in an example embodiment to be a single medium, the term "machine-readable medium" should be taken to include a single medium or multiple media (e.g., a centralized or distributed database, or associated caches and servers) able to store instructions (e.g., instructions 1024). The term "machine-readable medium" shall also be taken to include any medium that is capable of storing instructions (e.g., instructions 1024) for execution by the machine and that cause the machine to perform any one or more of the methodologies disclosed herein. The term "machine-readable medium" includes, but not be limited to, data repositories in the form of solid-state memories, optical media, and magnetic media.

Exemplary Use Case—Accommodation Recommendation for Nomadic Group

The above-described components of accommodation management system 130 and application 125 enable a system where accommodation recommendations based on enhanced education destinations may be determined and booked. For example, a guest user of a group may request, via user interface of application 125A, an accommodation recommendation for a required curriculum and a time period. Application 125A may notify accommodation management system 130 of the request and may determine an accommodation request.

Figure 11:
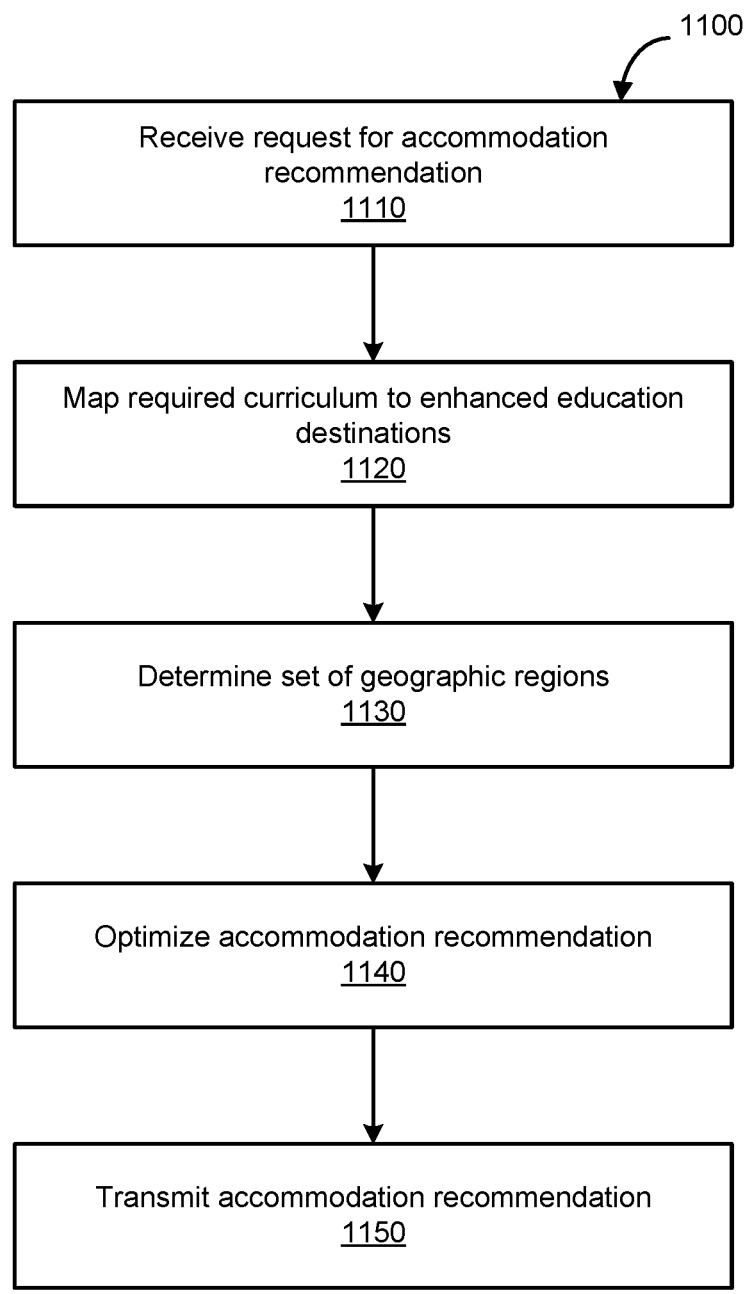
FIG. 11 illustrates a process for augmenting a required curriculum of an individual in a nomadic group, according to one embodiment.

FIG. 11 illustrates an example process 1100 for augmenting a required curriculum of an individual in a nomadic group, according to one embodiment. User interface module 290 receives 1110, from a guest client device 120, a request for an accommodation recommendation from a nomadic group following a nomadic path. A nomadic path may be, for example, an unplanned or a planned path of travel across a plurality of geographies. The nomadic group includes an individual who may request a curriculum for completion as well as a time period in which to complete the curriculum. In some embodiments, the request may include information describing an age of the individual, and curriculum module 235 retrieves, from the curriculum store 240 or an external database, the required curriculum for the individual based on the age of the individual. In other embodiments, the request includes information describing the required curriculum for the individual. Accommodation recommendation module 250 maps 1120 the required curriculum to enhanced education destinations in destination store 232 and determines 1130 a set of geographic regions including the enhanced education destinations. Examples of mappings are shown in relation to FIGS. 3A-3C.

Accommodation recommendation module 250 optimizes 1140 the accommodation recommendation based on the enhanced education destinations and the geographic regions. In some embodiments, accommodation recommendation module 250 optimizes 1140 the accommodation recommendation by selecting a geographic region that includes the geographic locations of enhanced education destinations corresponding to a threshold number of topics in the required curriculum and selects available listings available during the time period for the accommodation recommendations based on distance of the listing to each of the enhanced education destinations in the geographic region. In other embodiments, accommodation recommendation module 250 determines an accommodation recommendation for each sequence of a curriculum and creates an itinerary using the accommodation recommendations. In further embodiments, accommodation recommendation module 250 determines geographic regions for the accommodation recommendations by minimizing a distance metric between each geographic region. For some nomadic groups, accommodation recommendation module determines accommodation recommendations for sequences of the required curriculum, and booking module 260 automatically books listings of the accommodation recommendations when the sequence is within a threshold amount of time from a current time.

User interface module 290 transmits 1150 the accommodation recommendation for display on a user interface on the guest client device 120. In some embodiments, the accommodation recommendation includes a listing, the enhanced education destinations, and topics of the required curriculum related to the enhanced education destinations. Example user interfaces are shown in relation to FIGS. 4-9. In other embodiments, user interface module 290 receives an indication that the guest user would like to book the listings, travel options, and/or tickets for destinations in the accommodation recommendation, and booking module 260 makes the bookings. For listings, booking module 260 books each listing by populating booking store 220 for the listing with user account data for the guest user.

Exemplary Use Case—Accommodation Recommendation for Satisfying Curriculum Scope

The above-described components of accommodation management system 130 and application 125 enable a system where an accommodation recommendation for satisfying a curriculum scope may be determined and booked. For example, a guest user may input, via user interface of application 125A, a desired curriculum scope and a time period. Application 125A may notify accommodation management system 130 each time an input from a guest user is received and may determine an accommodation recommendation for the curriculum scope during the time period.

Figure 12:
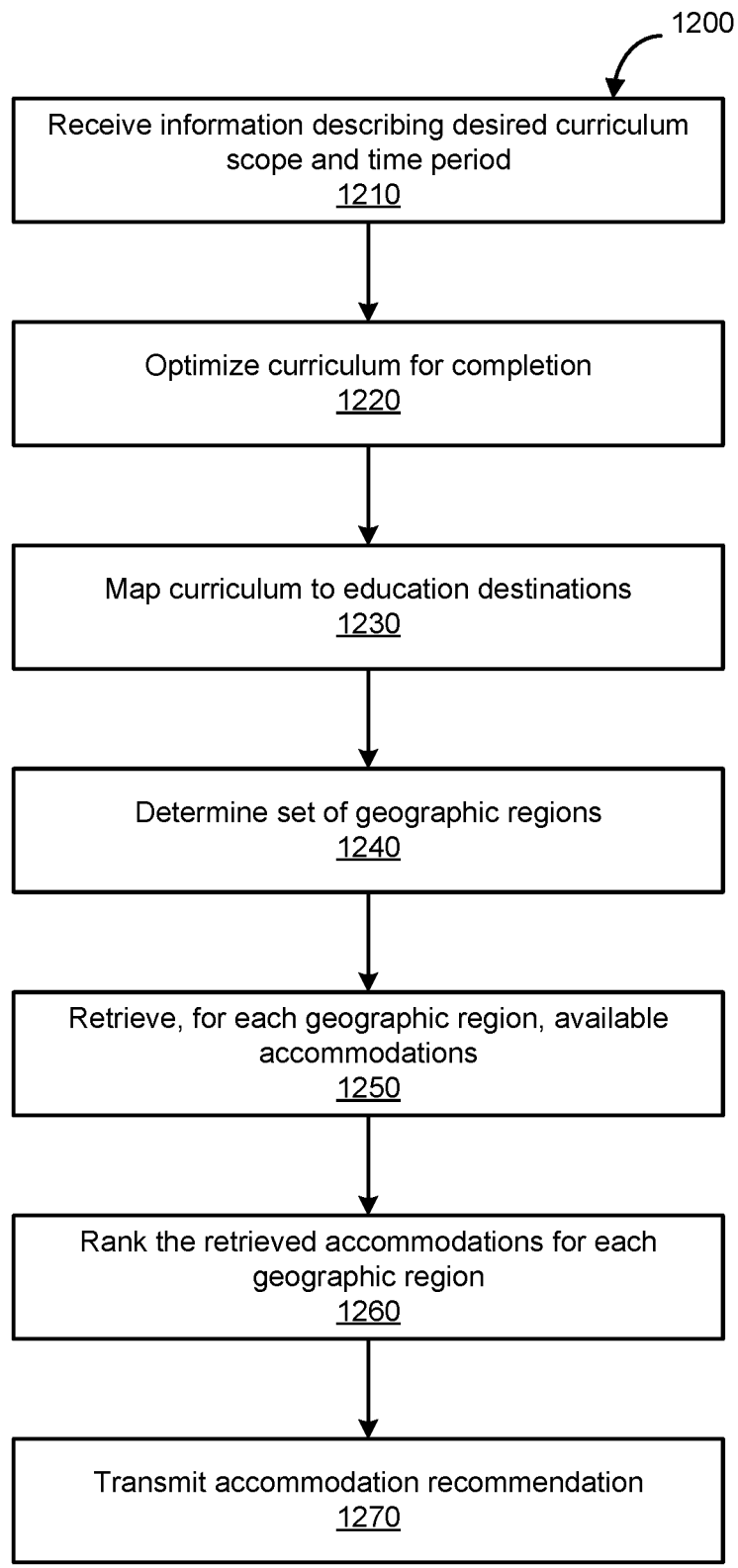
FIG. 12 illustrates a process for determining an accommodation recommendation for satisfying a curriculum scope during nomadic travel, according to one embodiment.

FIG. 12 illustrates an example process 1200 for determining an accommodation recommendation for satisfying a curriculum scope during nomadic travel, according to one embodiment. User interface module 290 receives 1210, from guest client device 120, information describing a desired curriculum scope and a time period. Curriculum module 235 optimizes 1220 a curriculum for completion based on subjects mapped from the curriculum scope and the time period, and accommodation recommendation module 250 maps 1230 the curriculum to education destinations. Examples of mappings are shown in relation to FIGS. 3A-3C. Accommodation recommendation module 250 determines 1240 a set of geographic regions based on the education destinations and retrieves 1250, from listing store 210 for each geographic region, listings available in the geographic region during a subset of the time period.

Accommodation recommendation module 250 ranks 1260, for each geographic region, the listings based on the education destinations. In some embodiments, curriculum module 235 maps topics and/or assignments of the curriculum to education destinations in the geographic region and ranks the listings based on distance to the education destinations. User interface module 290 transmits 1270, for display via a user interface of the guest client device 120, an accommodation recommendation. In some embodiments, the accommodation recommendation includes listings, education destinations, and travel options in one of more of the geographic regions. In other embodiments, the accommodation recommendation includes an itinerary, which is a compilation of multiple accommodation recommendations for various geographic regions outlining a trip to the geographic regions to satisfy the desired curriculum scope. In some embodiments, the itinerary outlines education destinations to visit in each geographic region.

In some embodiments, user interface module 290 retrieves, from guest client device 120, a geographic region corresponding to a location of guest client device 120. Accommodation recommendation module 250 determines a new accommodation recommendation for the desired curriculum scope and the geographic region corresponding to a current time period, and user interface module 290 sends the user interface for display via guest client device 120. In other embodiments, accommodation recommendation module 250 determines, for each geographic region in a nomadic travel itinerary entered by a guest user, an accommodation recommendation for satisfying the desired curriculum scope, and user interface module 290 sends the accommodations recommendations to guest client device 120. Example user interfaces are shown in relation to FIGS. 4-9.

In some embodiments, user interface module 290 receives an indication that the guest user would like to book the listings, travel options, and/or tickets for destinations or the itinerary of the accommodation recommendation, and booking module 260 makes the bookings. For listings, booking module 260 books each listing by populating booking store 220 for the listing with user account data for the guest user.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The disclosed configurations described in this specification solve the technical problem of a lack of a system for combining disparate data to comprehensively determine an accommodation recommendation based on a required curriculum or desired curriculum scope. In some embodiments, the disclosed configurations employ various modules to map a required curriculum to destinations and determine and optimize an accommodation recommendation based on the destinations. In other embodiments, the disclosed configurations employ various modules to optimize a curriculum for a desired curriculum scope and determine an accommodation recommendation based on destinations related to the curriculum.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for augmenting a required curriculum of an individual in a nomadic group and/or satisfying a curriculum during nomadic travel through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for augmenting a required curriculum of an individual in a nomadic group, the method comprising:
   receiving, from a client device by an accommodation management system, a request for an accommodation recommendation, the request including a time period and a required curriculum;
   determining a set of destinations that satisfy the required curriculum over the time period by performing operations comprising:
      analyzing, using a machine learning model trained to generate a percentage match to a destination, information describing the required curriculum in a curriculum database;
      generating, by the machine learning model, a percentage match to each destination in a destination database; and
      selecting destinations with a percentage match above a predetermined threshold value to comprise the set of destinations;
   grouping destinations in the set of destinations by geographic region;
   selecting one or more geographic regions for subsets of the time period based on travel requirements for the required curriculum and at least one of: user preference information retrieved from a user profile database, a size of a group for travel, a geographic region, travel experience of one or more user in the group for travel, or an amount of travel requested by one or more user in the group for travel;
   for each selected geographic region and corresponding subset of the time period, determining one or more listings for accommodations available in the selection geographic region during the subset of the time period;
   optimizing the accommodation recommendation based on the determined one or more listings in each selected geographic region using a weighted combination of user preference information of each user in the group for travel as stored in the user profile database and listing information in a listing database that includes listing information for each listing; and
   transmitting, for display on a user interface at the client device, the accommodation recommendation.

2. The computer-implemented method of claim 1, wherein optimizing the accommodation recommendation further comprises:
   booking a listing of the accommodation recommendation by populating a booking data structure for the listing with user account data for a user of the client device; transmitting, for display on the client device, an indication that the listing was booked.

3. The computer-implemented method of claim 1, wherein
   selecting one or more geographic regions further includes determining geographic locations corresponding to a threshold number of topics in the required curriculum.

4. The computer-implemented method of claim 1, wherein topics of the required curriculum correspond to sequences of time in an academic year, the method further comprising:
   determining, for each sequence, an accommodation recommendation; and
   transmitting, for display on the user interface at the client device, an itinerary including the accommodation recommendation for each sequence.

5. The computer-implemented method of claim 4, wherein determining, for each sequence, an accommodation recommendation comprises:
   minimizing a distance metric between each accommodation recommendation.

6. The computer-implemented method of claim 4, the method further comprising:
   responsive to a sequence being within a threshold amount of time, booking a listing of the accommodation recommendation for the sequence by populating a booking data structure for the listing with user account data for a user of the client device.

7. The computer-implemented method of claim 1, wherein the request includes information describing an age of the individual, and the method further comprises:
   retrieving, from an external database, a required curriculum for the age of the individual.

8. The computer-implemented method of claim 1, wherein the request includes information describing the required curriculum.

9. The computer-implemented method of claim 1, wherein the accommodation recommendation includes a listing, enhanced education destinations, and topics of the required curriculum related to the enhanced education destinations.

10. A system for augmenting a required curriculum of an individual in a nomadic group, system comprising:
    at least one processor;
    a memory storing instructions that when executed cause the processor to perform operations comprising:
    receiving, from a client device by an accommodation management system, a request for an accommodation recommendation, the request including a time period and a required curriculum;
    determining a set of destinations that satisfy the required curriculum over the time period by performing operations comprising:
       analyzing, using a machine learning model trained to generate a percentage match to a destination, information describing the required curriculum in a curriculum database;
       generating, by the machine learning model, a percentage match to each destination in a destination database; and
       selecting destinations with a percentage match above a predetermined threshold value to comprise the set of destinations;
    grouping destinations in the set of destinations by geographic region;
    selecting one or more geographic regions for subsets of the time period based on travel requirements for the required curriculum and at least one of: user preference information retrieved from a user profile database, a size of a group for travel, a geographic region, travel experience of one or more user in the group for travel, or an amount of travel requested by one or more user in the group for travel;

for each selected geographic region and corresponding subset of the time period, determining one or more listings for accommodations available in the selection geographic region during the subset of the time period;

optimizing the accommodation recommendation based on the determined one or more listings in each selected geographic region using a weighted combination of user preference information of each user in the group for travel as stored in the user profile database and listing information in a listing database that includes listing information for each listing; and transmitting, for display on a user interface at the client device, the accommodation recommendation.

11. The system of claim 10, wherein the operations further comprise:

booking a listing of the accommodation recommendation by populating a booking data structure for the listing with user account data for a user of the client device; and transmitting, for display on a user interface at the client device, an indication that the listing was booked.

12. The system of claim 10, wherein selecting one or more geographic regions further includes determining geographic locations corresponding to a threshold number of topics in the required curriculum.

13. The system of claim 10, wherein topics of the required curriculum correspond to sequences of time in an academic year, and the operations further comprise:

determining, for each sequence, an accommodation recommendation; and transmitting, for display on the user interface of the client device, an itinerary including the accommodation recommendation for each sequence.

14. The system of claim 13, wherein determining, for each sequence, an accommodation recommendation further comprises:

minimizing a distance metric between each accommodation recommendation.

15. The system of claim 13, the operations further comprising:

responsive to a sequence being within a threshold amount of time, booking a listing of the accommodation recommendation for the sequence by populating a booking data structure for the listing with user account data for a user of the client device.

16. A non-transitory computer readable medium configured to store instructions, the instructions when executed by a processor cause the processor to perform operations comprising:

receiving, from a client device by an accommodation management system, a request for an accommodation recommendation, the request including a time period and a required curriculum;

determining a set of destinations that satisfy the required curriculum over the time period by performing operations comprising:

analyzing, using a machine learning model trained to generate a percentage match to a destination, information describing the required curriculum in a curriculum database;

generating, by the machine learning model, a percentage match to each destination in a destination database; and selecting destinations with a percentage match above a predetermined threshold value to comprise the set of destinations;

grouping destinations in the set of destinations by geographic region;

selecting one or more geographic regions for subsets of the time period based on travel requirements for the required curriculum and at least one of: user preference information retrieved from a user profile database, a size of a group for travel, a geographic region, travel experience of one or more user in the group for travel, or an amount of travel requested by one or more user in the group for travel;

for each selected geographic region and corresponding subset of the time period, determining one or more listings for accommodations available in the selection geographic region during the subset of the time period;

optimizing the accommodation recommendation based on the determined one or more listings in each selected geographic region using a weighted combination of user preference information of each user in the group for travel as stored in the user profile database and listing information in a listing database that includes listing information for each listing; and transmitting, for display on a user interface at the client device, the accommodation recommendation.

17. The non-transitory computer-readable medium of claim 16, the operations further comprising:

booking a listing of the accommodation recommendation by populating a booking data structure for the listing with user account data for a user of the client device; and transmitting, for display on the user interface at the client device, an indication that the listing was booked.

18. The non-transitory computer-readable medium of claim 16, wherein selecting one or more geographic regions further includes determining geographic locations corresponding to a threshold number of topics in the required curriculum.

19. The non-transitory computer-readable medium of claim 16, wherein topics of the required curriculum correspond to sequences of time in an academic year, and the operations further comprise:

determining, for each sequence, an accommodation recommendation; and transmitting, for display on the user interface of the client device, an itinerary including the accommodation recommendation for each sequence.

20. The non-transitory computer-readable medium of claim 19, wherein determining, for each sequence, an accommodation recommendation further comprises:

minimizing a distance metric between each accommodation recommendation.

* * * * *